US010668372B2

(12) United States Patent
Yokoyama et al.

(10) Patent No.: US 10,668,372 B2
(45) Date of Patent: Jun. 2, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Ryo Yokoyama, Tokyo (JP); Osamu Ito, Tokyo (JP); Yosuke Matsuzaki, Kanagawa (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 15/902,497

(22) Filed: Feb. 22, 2018

(65) Prior Publication Data

US 2018/0256974 A1    Sep. 13, 2018

(30) Foreign Application Priority Data

Mar. 8, 2017  (JP) .................. 2017-043969

(51) Int. Cl.
| | |
|---|---|
| *A63F 13/285* | (2014.01) |
| *A63F 13/211* | (2014.01) |
| *A63F 13/219* | (2014.01) |
| *A63F 13/426* | (2014.01) |
| *G06F 3/01* | (2006.01) |
| *G06F 3/038* | (2013.01) |
| *G06F 3/041* | (2006.01) |
| *A63F 13/213* | (2014.01) |
| *A63F 13/42* | (2014.01) |

(Continued)

(52) U.S. Cl.
CPC .......... *A63F 13/285* (2014.09); *A63F 13/211* (2014.09); *A63F 13/213* (2014.09); *A63F 13/219* (2014.09); *A63F 13/42* (2014.09); *A63F 13/426* (2014.09); *A63F 13/847* (2014.09); *G06F 3/011* (2013.01); *G06F 3/016* (2013.01); *G06F 3/0346* (2013.01); *G06F 3/0386* (2013.01); *G06F 3/041* (2013.01); *A63F 2300/8023* (2013.01)

(58) Field of Classification Search
CPC .... A63F 13/213; A63F 13/219; A63F 13/285; A63F 13/42; A63F 13/426; A63F 13/847; A63F 2300/8023; G06F 3/011; G06F 3/016; G06F 3/033; G06F 3/0386; G06F 3/0346
USPC ......................................... 463/36
See application file for complete search history.

(56) References Cited

U.S. PATENT DOCUMENTS

| | | | |
|---|---|---|---|
| 10,078,917 B1 * | 9/2018 | Gaeta .................. | G06F 3/012 |
| 2011/0276113 A1 * | 11/2011 | Cybulski .............. | A61B 18/042 |
| | | | 607/101 |

(Continued)

FOREIGN PATENT DOCUMENTS

JP      2015-166890 A      9/2015

*Primary Examiner* — Michael A Cuff
(74) *Attorney, Agent, or Firm* — Paratus Law Group, PLLC

(57) ABSTRACT

An information processing apparatus includes: an acquisition unit configured to acquire a plurality of pointer information on the basis of one or more sensor data; a determination unit configured to determine an input device corresponding to each pointer on the basis of features of the plurality of pointer information; and a generation unit configured to generate, in a case where a position of a pointer satisfies a predetermined condition, a predetermined tactile stimulation signal to be output to an input device corresponding to the pointer.

19 Claims, 32 Drawing Sheets

(51) Int. Cl.
*A63F 13/847* (2014.01)
*G06F 3/0346* (2013.01)

(56) References Cited

U.S. PATENT DOCUMENTS

| | | | |
|---|---|---|---|
| 2012/0176308 A1* | 7/2012 | Westermann | G06F 3/038 345/156 |
| 2014/0071459 A1* | 3/2014 | Nakatsukasa | G01B 11/25 356/611 |
| 2016/0124234 A1* | 5/2016 | Coni | H04N 13/363 348/60 |
| 2016/0182877 A1* | 6/2016 | Deluca | G06F 3/013 348/53 |
| 2016/0196692 A1* | 7/2016 | Kjallstrom | G06T 19/006 345/633 |
| 2017/0148339 A1* | 5/2017 | Van Curen | G09B 9/003 |
| 2019/0034076 A1* | 1/2019 | Vinayak | G06F 3/017 |

* cited by examiner

|  | Wavelength 1 | Wavelength 2 | Wavelength 3 |
|---|---|---|---|
| Input device 2-1A | ● |  |  |
| Input device 2-1B |  | ● |  |
| Input device 2-1C | ● | ● |  |
| Input device 2-1D |  |  | ● |
| Input device 2-1E | ● |  | ● |
| Input device 2-1F |  | ● | ● |
| Input device 2-1G | ● | ● | ● |

FIG.11

IR camera video

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2017-043969 filed Mar. 8, 2017, the entire contents of which are incorporated herein by reference.

BACKGROUND

The present disclosure relates to an information processing apparatus, an information processing method, and a program.

A remote controller that is connected to a television receiver of the like via wireless communication and performs an operation has been known.

Further, a technology for providing a tactile output such as vibration to a user in accordance with video or audio in order to improve the reality of content such as movies and video games has become common. For example, in Japanese Patent Application Laid-open No. 2015-166890, a technology for improving the reality of content by delaying the tactile output from a controller on the basis of a position where an event occurs in virtual space of the content is disclosed.

SUMMARY

However, in the above-mentioned related art, it is assumed that a small number of users in a home or an amusement facility operate controllers, and it has been difficult to distinguish many controllers and to cause the respective controllers to output corresponding tactile stimulation such as vibration.

In view of the above, the present disclosure proposes an information processing apparatus, an information processing method, and a program that are capable of achieving an intuitive tactile interface with more reality, which presents, on the basis of inputs from many input devices, predetermined tactile stimulation to corresponding input devices.

According to an embodiment of the present disclosure, there is provided an information processing apparatus including: an acquisition unit configured to acquire a plurality of pointer information on the basis of one or more sensor data; a determination unit configured to determine an input device corresponding to each pointer on the basis of features of the plurality of pointer information; and a generation unit configured to generate, in a case where a position of a pointer satisfies a predetermined condition, a predetermined tactile stimulation signal to be output to an input device corresponding to the pointer.

According to an embodiment of the present disclosure, there is provided an information processing method including: by a processor, acquiring a plurality of pointer information on the basis of one or more sensor data; determining an input device corresponding to each pointer on the basis of features of the plurality of pointer information; and generating, in a case where a position of a pointer satisfies a predetermined condition, a predetermined tactile stimulation signal to be output to an input device corresponding to the pointer.

According to an embodiment of the present disclosure, there is provided a program that causes a computer to functions as: an acquisition unit configured to acquire a plurality of pointer information on the basis of one or more sensor data; a determination unit configured to determine an input device corresponding to each pointer on the basis of features of the plurality of pointer information; and a generation unit configured to generate, in a case where a position of a pointer satisfies a predetermined condition, a predetermined tactile stimulation signal to be output to an input device corresponding to the pointer.

As described above, according to the present disclosure, it is possible to achieve an intuitive tactile interface with more reality, which presents, on the basis of inputs from many input devices, predetermined tactile stimulation to corresponding input devices.

It should be noted that the above-mentioned effects are not necessarily limitative and any effect described herein or another effect that can be known herein may be exerted with or instead of the above-mentioned effects.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 11 is a diagram describing an example of a combination of light emission wavelengths of input devices in the case of using three types of wavelengths in the first embodiment;

DETAILED DESCRIPTION OF EMBODIMENTS

Figure 1:
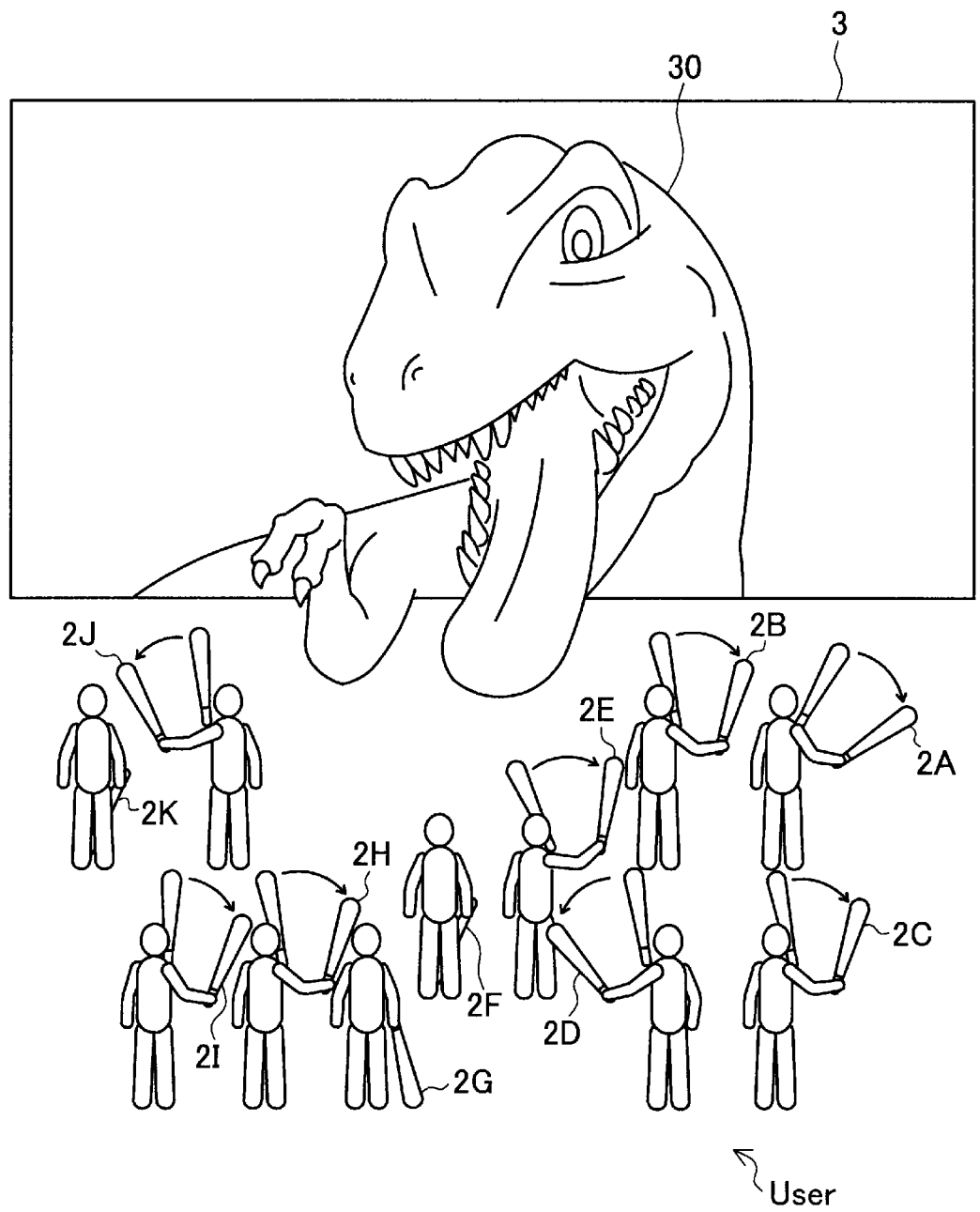
FIG. 1 is a diagram showing an overview of an information processing system according to an embodiment of the present disclosure.

Hereinafter, favorable embodiments of the present disclosure will be described in detail with reference to the accompanying drawings. It should be noted that the components having substantially the same functional configuration will be denoted by the same reference symbols, and duplicate description will be omitted herein and in the drawings.

Note that description will be made in the following order.
1. Overview of Information Processing System according to Embodiment of Present Disclosure
2. Configuration
2-1. Entire Configuration
2-2. Configuration of information Processing Apparatus
3. First Embodiment
3-1. Overview
3-2. Configuration of Input Device
3-3. Operational Processing
3-4. Others
4. Second Embodiment
4-1. Configuration of input Device
4-2. Operational Processing
4-3. First Modified Example
4-4. Second Modified Example
5. Supplementary note
6. Conclusion
7. Regarding Transmission Delay
8. Regarding Distinguishing of input Devices
9. Modified Example 1. Overview of Information Processing System According to Embodiment of Present Disclosure An overview of an information processing system according to an embodiment of the present disclosure will be described with reference to FIG. 1. In the information processing system according to this embodiment, many users hold respective input devices 2 (2A to 2K), and perform operations such as shaking the input devices 2 with respect to a stereoscopic object 30 displayed on a front screen 3. Each of the input devices 2 includes a light emission unit that emits invisible light such as infrared rays, and is capable of causing the screen 3 to be irradiated with a pointer.

Because three-dimensional (3D) video is projected on the screen 3 by a projector 5, the user is capable of performing an operation such as swinging and attacking the input device 2 with respect to the stereoscopic object 30 coming close to him/her.

Figure 2:
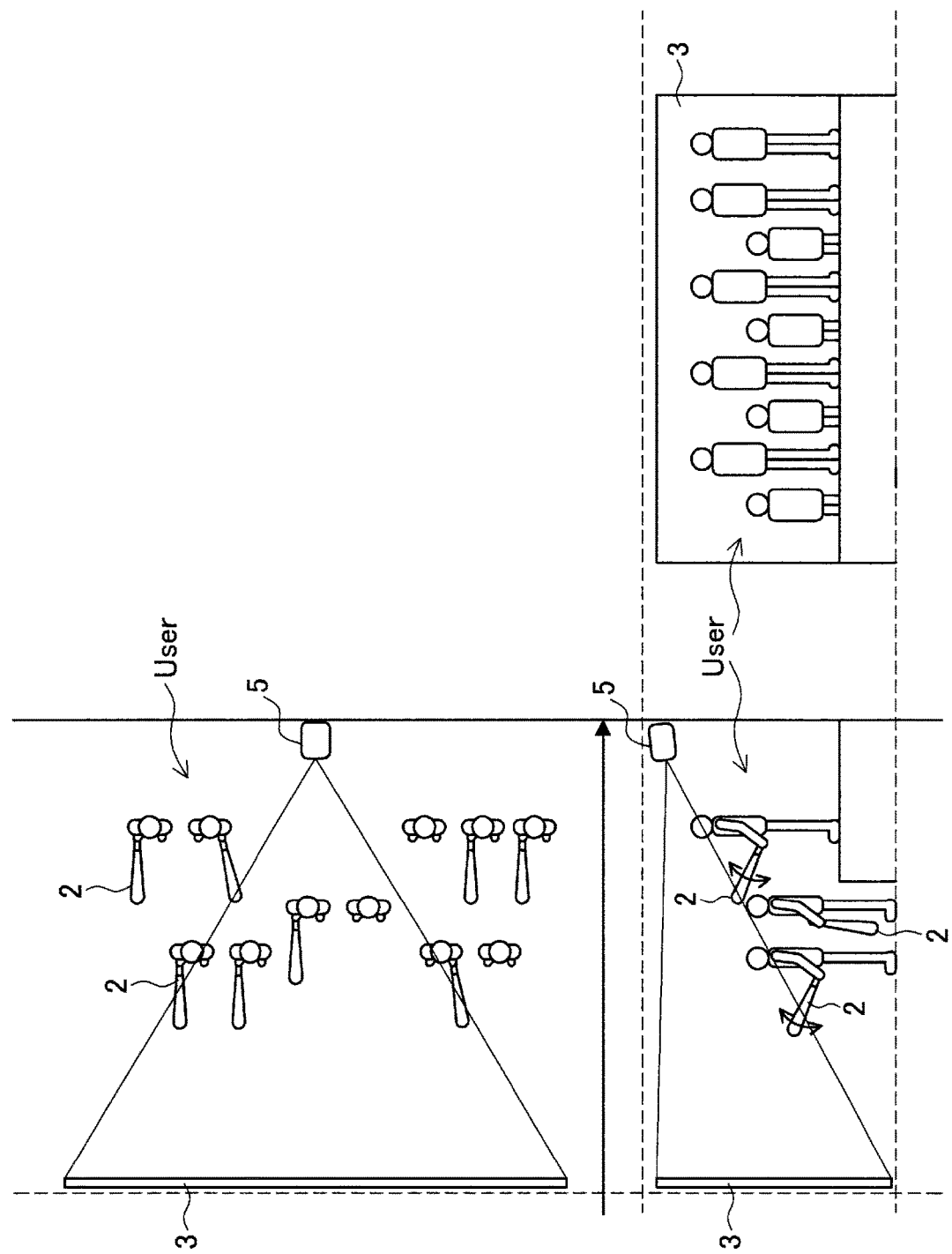
FIG. 2 is a diagram showing an example of arrangement of a display apparatus, a 3D projector, and users in this embodiment.

Next, an example of arrangement of the screen 3, the projector 5, and the users in this embodiment is shown in FIG. 2. As shown in FIG. 2, many users hold the input devices 2 and face the large screen 3, and the projector 5 is placed above the users and projects 3D video on the screen 3. Further, although not shown in FIG. 1 and FIG. 2, a speaker 7 (FIG. 5) is placed in the periphery. In the example shown in FIG. 2, the users are standing. However, the users may be sitting. Further, in the example shown in FIG. 2, the projector 5 is placed on the ceiling. However, the projector 5 may be placed in another place.

Further, the input device 2 held by each user may have, for example, a bar shape as shown in FIG. 1 and FIG. 2, or a shape imitating a weapon such as a stick and a gun. The input device 2 has a structure that vibrates under control of an information processing apparatus 1 (see FIG. 5), and is capable of realizing the reality such as feeling on a virtual object in virtual space by returning feedback by predetermined vibration in the case where the user performs a predetermined operation on the stereoscopic object 30. A light emission unit 22 (see FIG. 8) that emits light such as infrared rays is provided at the tip of the input device 2. By using the light emission unit 22, the screen 3 can be irradiated with an infrared pointer when the user operates the input device 2 with respect to the screen 3. For example, in the case where the pointer overlaps with the stereoscopic object 30, the information processing apparatus 1 provides, on the basis of the position of the pointer applied to the screen 3 and the display position of the stereoscopic object 30, feedback by vibration that causes the user to perceive that the input device 2 comes into contact with the stereoscopic object 30.

Figure 3:
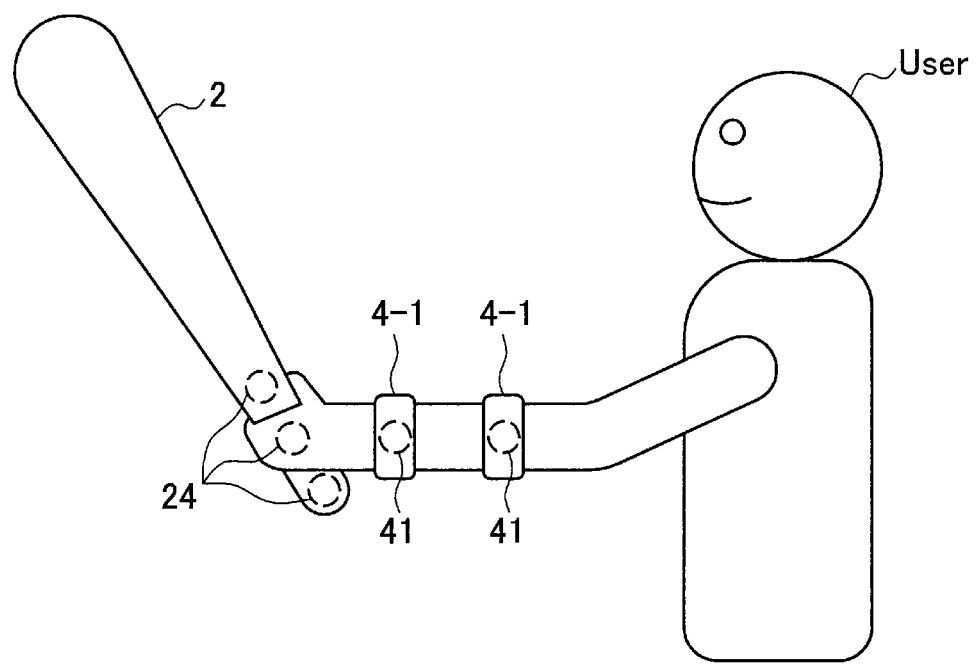
FIG. 3 is a diagram showing an example of a vibration unit incorporated in an input device and a tactile stimulation output device in this embodiment.

Next, the vibration function of the input device 2 will be described with reference to FIG. 3. FIG. 3 is a diagram showing an example of a vibration unit incorporated in an input device and a tactile stimulation output device in this embodiment. As shown in FIG. 3, a plurality of vibration units 24 are incorporated into the input device 2 in addition to the above-mentioned light emission unit, and vibrate under control of the information processing apparatus 1 (see FIG. 5). The input device 2 and the information processing apparatus 1 are connected to each other by wired or wireless connection, and are capable of transmitting receiving data to/from each other. The number of vibration units 24 to be incorporated into the input device 2 may be one or more. Further, the vibration units 24 may be incorporated in the handle portion held by the user of the input device 2 or another place of the input device 2.

Further, in this embodiment, as shown in FIG. 3, a tactile stimulation output device 4 is attached to the body of each user. Each tactile stimulation output device 4 and the information processing apparatus 1 are connected to each other via wired or wireless connection, and are capable of transmitting/receiving data to/from each other. The shape of the tactile stimulation output device 4 is not particularly limited. For example, the tactile stimulation output device 4 may be a band-type one as shown in FIG. 3. One or more vibration units 41 are incorporated in a band-type tactile stimulation output device 4-1, and vibrate under control of the information processing apparatus 1. Note that the shape of the tactile stimulation output device 4 is not limited to this, and the tactile stimulation output device 4 may be, for example, a jacket-type one as shown in FIG. 4.

Figure 4:
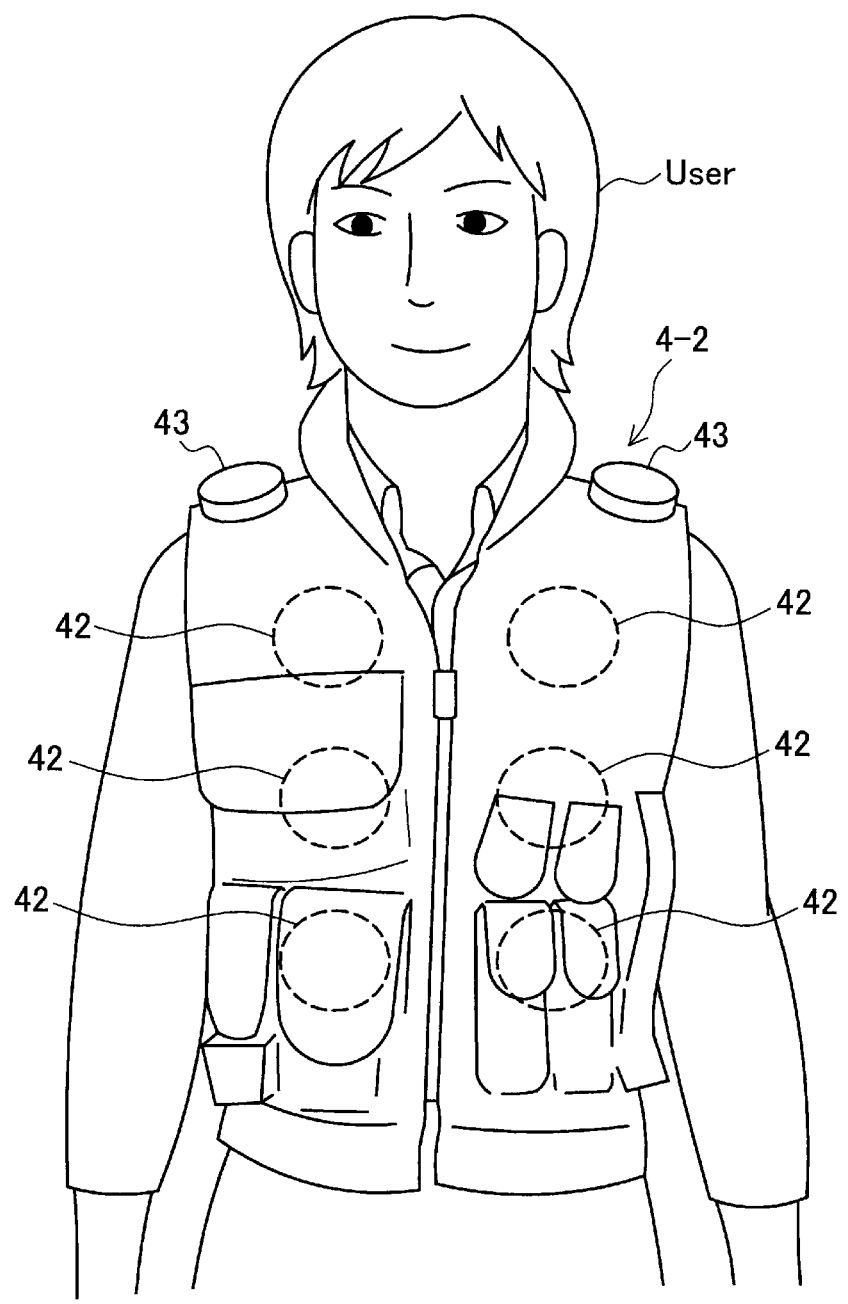
FIG. 4 is a diagram showing a jacket-type tactile stimulation output device in this embodiment.

As shown in FIG. 4, for example, a plurality of vibration units 42 are placed in a jacket-type tactile stimulation output device 4-2. The number and arrangement of the vibration units 42 are not limited to the example shown in FIG. 4. For example, the vibration units 42 may be provided on the back surface or the side surface. Further, in the case of the jacket-type tactile stimulation output device, at which position of the body each vibration unit 42 is placed when the user wears the jacket-type tactile stimulation output device can be known unlike the band-type tactile stimulation output device. Therefore, it is possible to more accurately provide vibration to a target part of the body. Note that although the jacket-type tactile stimulation output device is shown in the example shown in FIG. 4, this embodiment is not limited thereto. For example, the tactile stimulation output device 4 may be other garments such as jackets with sleeves, tops, trousers, gloves, hats, socks, and shoes. Further, the band-type tactile stimulation output device 4-1 can be attached also to a foot, a torso, a head, and the like, in addition to the arm.

Further, as shown in FIG. 4, a stereo speaker 43 is placed on the shoulder part of the jacket-type tactile stimulation output device 4-2. The stereo speaker 43 outputs audio transmitted from the information processing apparatus 1. The audio (sound) can be presented to each user depending on the operation of the input device 2 by the user, for example.

As described above, in this embodiment, it is possible to enhance the immersive feeling into virtual space and achieve higher reality by presenting a plurality of sensations such as 3D video, audio, and vibration to the user.

In the example described above, "vibration" is used as an example of tactile stimulation of the tactile stimulation output device 4. However, this embodiment is not limited thereto, and other tactile stimulation such as electrical stimulation, temperature, wind, and water may be used.

Further, in this embodiment, 3D video is projected on the screen 3. However, a large display apparatus may be placed instead.

Next, each configuration of an information processing system according to an embodiment of the present disclosure will be specifically described with reference to the drawings.

2. Configuration

<2-1. Entire Configuration>

Figure 5:
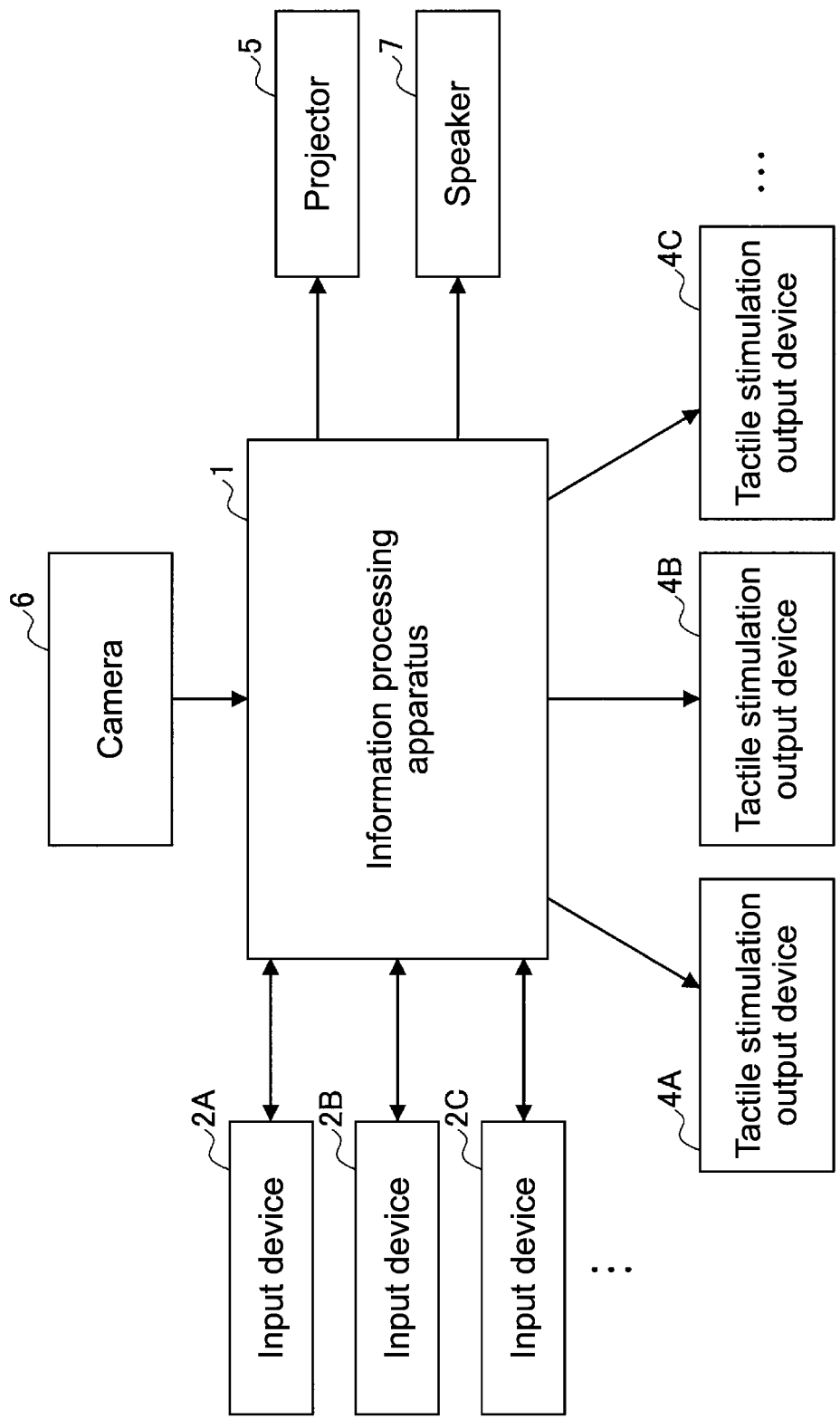
FIG. 5 is a diagram describing a configuration of the entire information processing system according to this embodiment.

FIG. 5 is a diagram showing a configuration of the entire information processing system according to this embodiment. As shown in FIG. 5, the information processing system according to this embodiment includes the information processing apparatus 1, many input devices 2 (2A to 2C), many tactile stimulation output devices 4 (4A to 4C), the projector 5, a camera 6, and the speaker 7.

The camera 6 is, for example, an IR camera that images the screen 3, and outputs a picked-up image to the information processing apparatus 1.

The information processing apparatus 1 is connected to the input devices 2, the tactile stimulation output devices 4, the camera 6, the projector 5, and the speaker 7, and controls each of the peripheral devices. For example, the information processing apparatus 1 controls 3D video projection on the screen 3 by the projector 5, and the audio output from the speaker 7. Further, the information processing apparatus 1 grasps, on the basis of the picked-up image output from the camera 6, the input state of each input device 2 with respect to the display screen of the screen 3, and performs control so that the corresponding input device 2 and the tactile stimulation output device 4 of the user holding that input device output predetermined tactile stimulation depending on the input state.

The input device 2 is an input device including the light emission unit 22 and the vibration unit 24 (see FIG. 8), and held by each user. Further, the input device 2 is capable of perform vibration output from the vibration unit 24 under control of the information processing apparatus 1.

The tactile stimulation output device 4 is an output device including the vibration unit 42 (see FIG. 3 and FIG. 4), and attached to each user. Further, the tactile stimulation output device 4 is capable of perform vibration output from the vibration unit 42 under control of the information processing apparatus 1.

The projector 5 is an output device including a projection unit, and projects, for example, 3D video on the screen 3 under control of the information processing apparatus 1.

The speaker 7 is an output device that outputs audio, and outputs an audio signal under control of the information processing apparatus 1.

<2-2. Configuration of Information Processing Apparatus>

Figure 6:
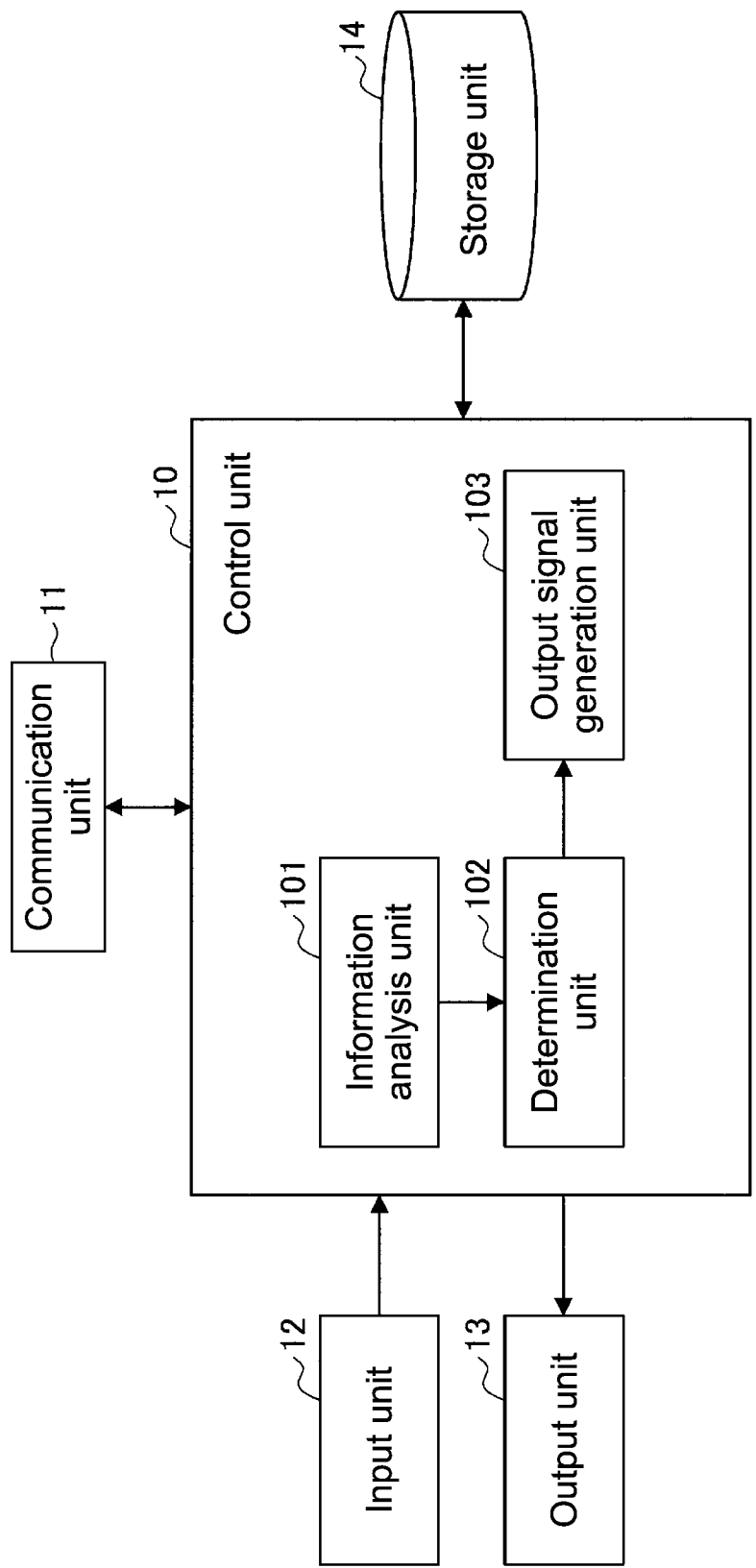
FIG. 6 is a block diagram showing an example of a configuration of an information processing apparatus according to this embodiment.

FIG. 6 is a block diagram showing an example of a configuration of the information processing apparatus 1 according to this embodiment. As shown in FIG. 6, the information processing apparatus 1 includes a control unit 10, a communication unit 11, an input unit 12, an output unit 13, and a storage unit 14.

The control unit 10 functions as an arithmetic processing device and a control device, and performs overall control of operations of the information processing apparatus 1 according to various programs. The control unit 10 is achieved by, for example, an electronic circuit such as a CPU (Central Processing Unit) and a microprocessor. Further, the control unit 10 may include a ROM (Read Only Memory) that stores programs to be used, arithmetic parameters, and the like, and a RAM (Random Access Memory) that temporarily stores appropriately changing parameters and the like.

Further, in this embodiment, the control unit 10 functions also as an information analysis unit 101, a determination unit 102, and an output signal generation unit 103.

The information analysis unit 101 analyzes one or more sensor data, and acquires a plurality of pointer information regarding the display screen of the screen 3. Specifically, the information analysis unit 101 identifies a position coordinate of a pointer on the display screen and features (combination of a plurality of wavelengths, a mark shape, a state during swinging, a state of a mark, a trajectory, and the like) of the pointer. The sensor data represents, for example, an IR image picked up by one or more cameras 6.

The determination unit 102 determines the input devices 2 corresponding to the pointers on the basis of the features of the plurality of pointer information acquired by the information analysis unit 101. In this embodiment, inputs (e.g., light emission by infrared rays) from many input devices 2 are performed on one display screen, and the determination unit 102 of the information processing apparatus 1 determines which pointer on the display screen is applied from which input device. At this time, the determination unit 102 performs determination of each of the input devices 2 by using the features of the pointer information analyzed by the information analysis unit 101 and output information (e.g., sensor information) from the input device 2. The specific distinguishing method will be specifically described in each embodiment.

In the case where the position of the pointer satisfies a predetermined condition, the output signal generation unit 103 generates a predetermined tactile stimulation signal to be output to the input device corresponding to the pointer. Specifically, for example, in the case where the position or orbit of the pointer overlaps with the stereoscopic object 30, the output signal generation unit 103 generates a tactile stimulation signal for causing the user to perceive that the input device 2 comes into contact with the stereoscopic object 30. At this time, a tactile stimulation signal for causing the user to perceive a virtual sensation (texture such as hardness and softness) when the input device 2 comes into contact with the stereoscopic object 30 is generated. Further, the output signal generation unit 103 may generate also an audio signal for causing the user to perceive virtual sound when the input device 2 comes into contact with the stereoscopic object 30. The generated tactile stimulation signal is output (transmitted) from the communication unit 11 to the corresponding input device 2. Further, the generated audio signal is output (transmitted) to the corresponding tactile stimulation output device 4 including a speaker.

Further, in the case where the position of the pointer satisfies the predetermined condition, the output signal generation unit 103 may further generate a predetermined tactile stimulation signal to be output to the tactile stimulation output device 4 attached to the user holding the input device 2 corresponding to the pointer. The generated tactile stimulation signal is output from the communication unit 11 to the corresponding tactile stimulation output device 4.

Accordingly, in the case of a game in which the user virtually hits the stereoscopic object 30 with the input device 2, for example, the information processing apparatus 1 according to this embodiment is capable of presenting, to the user, vibration and sound for causing the user to perceive that he/she actually hits the stereoscopic object 30 with the input device 2. Further, the information processing apparatus 1 is capable of outputting predetermined vibration from the jacket-type tactile stimulation output device 4-2 (see FIG. 4) so that a shock when hitting is given to the body of the user. Further, the information processing apparatus 1 is capable of outputting, from the jacket-type tactile stimulation output device 4-2, also predetermined vibration for causing the user to perceive that the attack fails and the stereoscopic object 30 hits the user or a specific part of the body is actually attacked, together with video that the stereoscopic object 30 attacks the user.

The communication unit 11 is a communication module for transmitting/receiving data to/from another apparatus via wired or wireless communication. The communication unit 11 wirelessly communicates with an external apparatus directly or via a network access point by using a method such as a wired LAN (Local Area Network), wireless LAN, Wi-Fi (registered trademark), infrared communication, Bluetooth (registered trademark), and short-distance/contactless communication. For example, in this embodiment, the communication unit 11 transmits a tactile stimulation signal to the input device 2 and the tactile stimulation output device 4.

The input unit 12 receives an operation instruction from an administrator or the like, and outputs the operation content to the control unit 10. The input unit 12 may be a touch sensor, pressure sensor, or proximity sensor provided integrally with a display. Alternatively, the input unit 12 may have a physical configuration, e.g., a keyboard, a button, a switch, and a lever. Further, the input unit 12 may be a microphone.

The output unit 13 is, for example, a display that outputs an operation screen or menu screen for an administrator, or the like. Specific examples of the output unit 13 include a liquid crystal display (LCD: Liquid Crystal Display) and an organic EL (Electroluminescence) display. Further, the output unit 13 may further include a speaker that outputs audio.

The storage unit 14 stores a program for the above-mentioned control unit 10 to execute each function, and a parameter. Further, the storage unit 14 includes a storage device including a storage medium, a recording device that records data in the storage medium, a reading device that reads the data from the storage medium, a deletion device that deletes the data recorded in the storage medium, and the like. Note that this storage unit 14 may be a storage medium such as a non-volatile memory such as a Flash ROM (or Flash Memory), an EEPROM (Electrically Erasable Programmable Read-Only Memory), an EPROM (Erasable Programmable ROM), a magnetic disc such as a hard disc and a discoid magnetic disc, an optical disc such as a CD (Compact Disc), a DVD-R (Digital Versatile Disc Recordable), and a SD (Blu-Ray Disc (registered trademark)), and an MO (Magneto Optical) disc.

Each configuration of the information processing system according to an embodiment of the present disclosure has been specifically described heretofore. Next, embodiments of the information processing system according to this embodiment will be specifically described with reference to the drawings.

3. First Embodiment

<3-1. Overview>

As described above, the information processing apparatus 1 according to this embodiment is capable of providing feedback by a predetermined tactile stimulation output to each input device 2 depending on the input (i.e., position or movement of the pointer) of the input device 2 by determining, by the determination unit 102, which pointer on the display screen is applied from which input device 2.

Note that by using IR emitters with different wavelengths and cameras with band pass filers corresponding to those wavelengths, it is possible to determine the position of the pointer on the display screen and association of the pointer with the corresponding IR emitter. However, considering the precision of the filter, it is necessary to separate the wavelength band to some extent, the number of wavelength bands is at most about four, e.g., 800 nm, 850 nm, 900 nm, and 950 nm, and only four IR emitters can be distinguished. Therefore, it has been difficult to simultaneously distinguish many people.

Figure 7:
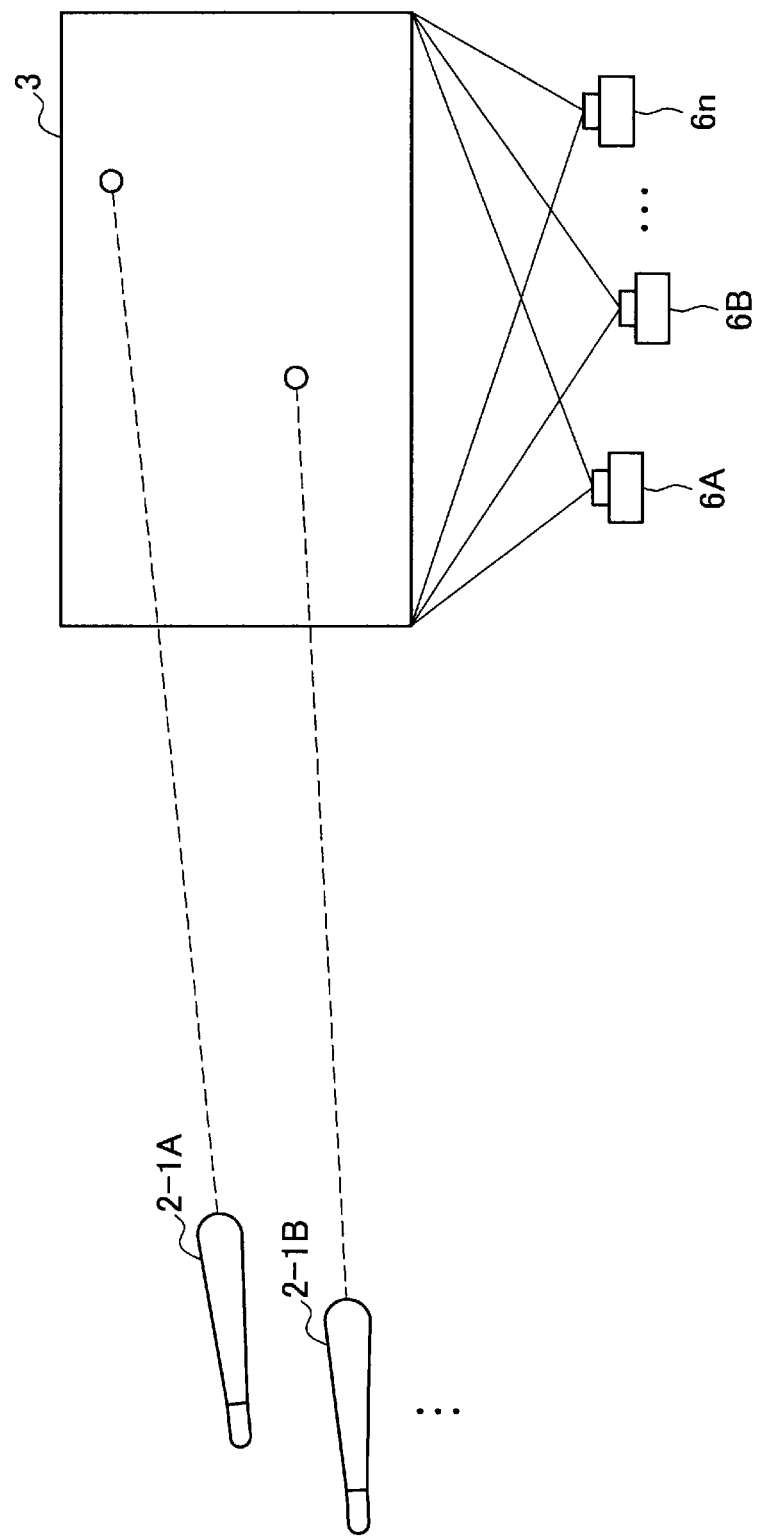
FIG. 7 is a diagram describing an overview of an information processing system according to a first embodiment of the present disclosure.

In this regard, a first embodiment makes it possible to simultaneously distinguish many people by using input devices that emit light with one or more IR wavelengths out of n types of IR wavelengths and cameras with n wavelength band-pass filters. FIG. 7 is a diagram describing an overview of an information processing system according to the first embodiment.

As shown in FIG. 7, in this embodiment, many input devices 2-1 (2-1A, 2-1B, ...) that emit light with one or more IR wavelengths and cameras 6A to 6n with band filters of different wavelength, which images the screen 3, are used.

The information processing apparatus 1 according to this embodiment analyzes each of picked-up images output from the cameras 6A to 6n, and determines the input devices 2 corresponding to the respective pointers on the display screen. In this embodiment, by using the input devices 2 that emit light with a plurality of IR wavelengths, it is possible to distinguish $2^n-1$ people in the case where n types of wavelengths are used.

<3-2. Configuration of Input Device>

Figure 8:
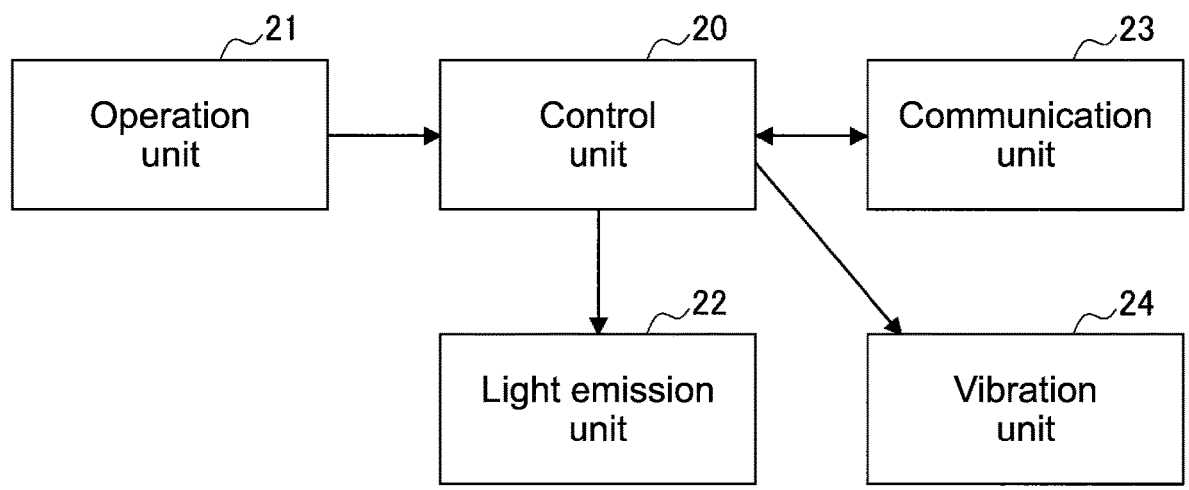
FIG. 8 is a block diagram showing an example of a configuration of an input device in the first embodiment.

First, a configuration of the input device 2-1 in this embodiment will be described with reference to FIG. 8. FIG. 8 is a block diagram showing an example of a configuration of the input device 2-1 in this embodiment. As shown in FIG. 8, the input device 2-1 includes a control unit 20, an operation unit 21, the light emission unit 22, a communication unit 23, and the vibration unit 24.

The control unit 20 functions as arithmetic processing device and a control device, and performs overall control of operations of the input device 2-1 in accordance with various programs. The control unit 20 is achieved by, for example, an electronic circuit such as a CPU and a microprocessor. Further, the control unit 20 may include a ROM that stores programs to be used, arithmetic parameters, and the like, and a RAM that temporarily stores appropriately changing parameters and the like.

The control unit 20 in this embodiment controls on/off of light emission of the light emission unit 22 in accordance with the operation input via the operation unit 21, for example, and controls vibration output of the vibration units 24 in accordance with the tactile stimulation signal transmitted from the information processing apparatus 1 via the communication unit 23.

The operation unit 21 switches on/off of the power source of the input device 2-1 and on/off of light emission of the light emission unit 22 in accordance with a user operation. The operation unit 21 is achieved by, for example, a switch, a button, a lever, a touch sensor, a pressure sensor, or the like.

The light emission unit 22 emits invisible light such as infrared rays. The light emission unit 22 in this embodiment has a function of emitting light with n types of IR wavelengths, for example.

The communication unit 23 is connected to the information processing apparatus 1 via wired or wireless connection, and transmits/receives data to/from the information processing apparatus 1. For example, the communication unit 23 receives a tactile stimulation signal from the information processing apparatus 1.

The vibration unit 24 is a small-sized vibration actuator that outputs vibration stimulation as an example of the tactile stimulation. The vibration unit 24 includes one or more vibration actuators.

<3-3. Operational Processing>

Figure 9:
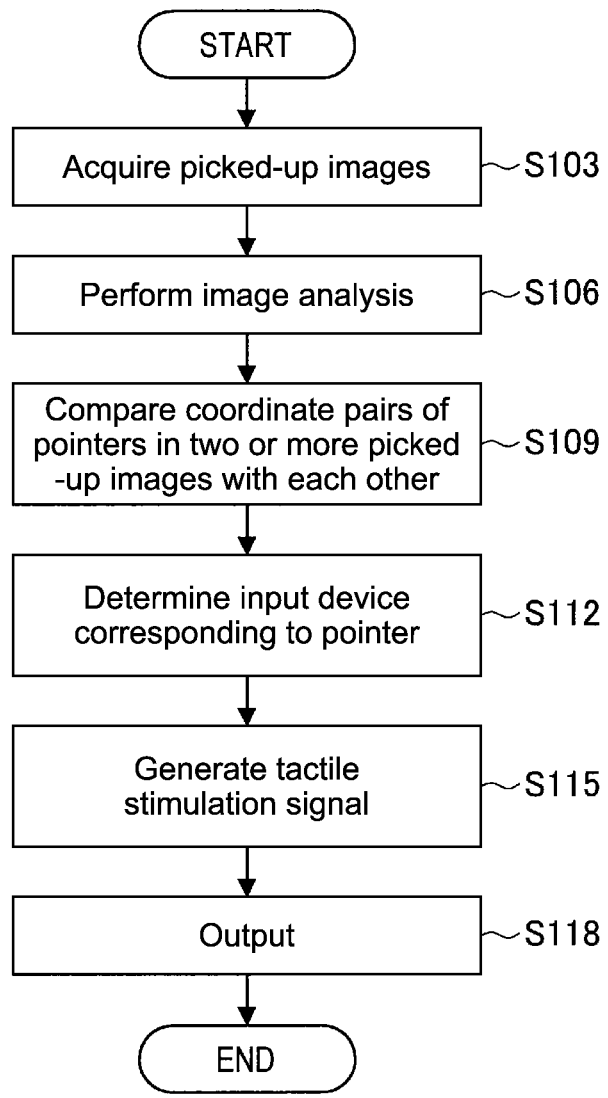
FIG. 9 is a flowchart showing operational processing in the first embodiment.

Next, operational processing in the first embodiment will be described with reference to FIG. 9. FIG. 9 is a flowchart showing operational processing in this embodiment.

As shown in FIG. 9, first, the information processing apparatus 1 acquires images picked up by the cameras 6A to 6n (Step S103).

Next, the information analysis unit 101 of the information processing apparatus 1 performs image analysis on the picked-up image to identify a coordinate position of a pointer (light emission point) (Step S106).

Next, the determination unit 102 of the information processing apparatus 1 compares coordinate pairs of pointers in two or more picked-up images with each other (Step S109), and determines the input device corresponding to the pointer (Step S112). A method of determining the input device corresponding to the comparison of coordinate pairs of pointers will be described below with reference to FIG. 10 and FIG. 11.

Figure 10:
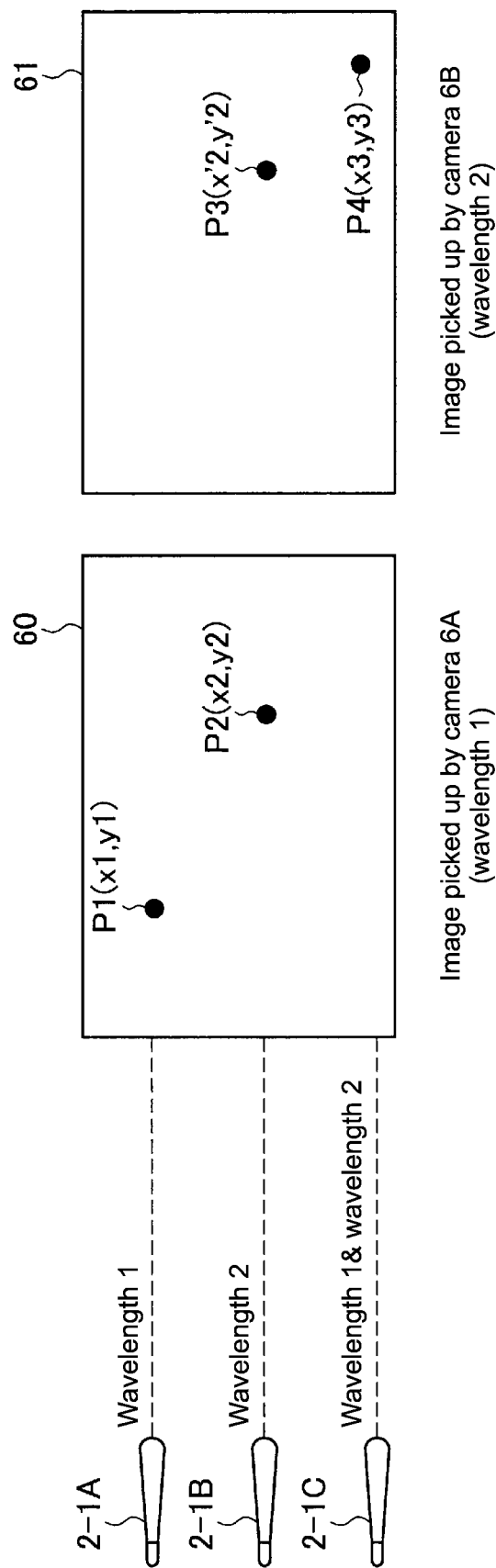
FIG. 10 is a diagram describing a case of distinguishing three input devices by using two types of wavelengths in the first embodiment.

FIG. 10 is a diagram describing a case of distinguishing three input devices 2 by using two types of wavelengths. In the example shown in FIG. 10, IR with a wavelength 1 is emitted from an input device 2-1A, IR with a wavelength 2 is emitted from an input device 2-1B, and IR with the wavelength 1 and the wavelength 2 is emitted from an input device 2-1C. Further, in FIG. 10, an image 60 picked up by a camera 6A with a band-pass filter of the wavelength 1 and an image 61 picked up by a camera 6B with a band-pass filter of the wavelength 2 are shown.

The determination unit 102 respectively compares pointer coordinate pairs P1 (x1, y1) and P2 (x2, y2) of the image 60 identified by the information analysis unit 101 and pointer coordinate pairs P3 (x'2, y'2) and P4 (x3, y3) of the image 61 identified by the information analysis unit 101 with each other, and determines that the pointer at substantially the same coordinate pair in a plurality of picked-up images is applied from the input device 2-1C that emits IR with the plurality of types of wavelengths corresponding thereto. Information regarding the IR emission wavelength of each of the input devices 2-1 is registered in, for example, the storage unit 14 in advance.

An example of the calculation formula for identifying substantially the same coordinate pair is shown below. Note that the calculation formula in the case of comparing the coordinate pairs P2 (x2, y2) and P3 (x'2, y'2) is shown as an example. In the case where the following formula is satisfied, the determination unit 102 determines that the pointers are at substantially the same coordinate pair, and that the input device 2-1C that emits IR with the wavelength 1 and the wavelength 2 is the corresponding input device.

$$\text{if } \sqrt{(x_2-x'_2)^2+(y_2-y'_2)^2}<\varepsilon \qquad \text{[Math. 1]}$$

FIG. 11 is a diagram describing an example of a combination of light emission wavelengths of input devices in the case of using three types of wavelengths. As shown in FIG. 11, in the case of using three types of IR wavelengths of the wavelength 1, the wavelength 2, and a wavelength 3, it is possible to distinguish seven input devices of the input device 2-1A to 2-1C and input devices 2-1D to 2-1G, in other words, seven people. In this case, as the IR camera, the camera 6A with a band-pass filter of the wavelength 1, the camera 6B with a band-pass filter of the wavelength 2, and a camera 6C with a band-pass filter of the wavelength 3 are used.

Further, although not shown, in the case of using four types of IR wavelengths, it is possible to distinguish 15 input devices, in other words, 15 people.

The method of distinguishing the input devices 2-1 has been specifically described heretofore.

Next, the output signal generation unit 103 of the information processing apparatus 1 generates, in the case where the position of the identified pointer satisfies a predetermined condition, a predetermined tactile stimulation signal to be output to the input device 2-1 corresponding to that pointer (Step S115). For example, in the case where the pointer overlaps with the stereoscopic object 30, the output signal generation unit 103 generates a tactile stimulation signal for causing the user to perceive that the input device 2-1 comes into contact with the stereoscopic object 30.

Then, the information processing apparatus 1 transmits the generated tactile stimulation signal from the communication unit 11 to the target input device 2-1, and causes the input device 2-1 to output the tactile stimulation (Step S118).

<3-4. Others>

In the example described above, $2^n-1$ people can be distinguished by using n types of wavelengths. However, by providing the following pointer features, it is possible to distinguish further many people.

(Mark Shape)

Figure 12:
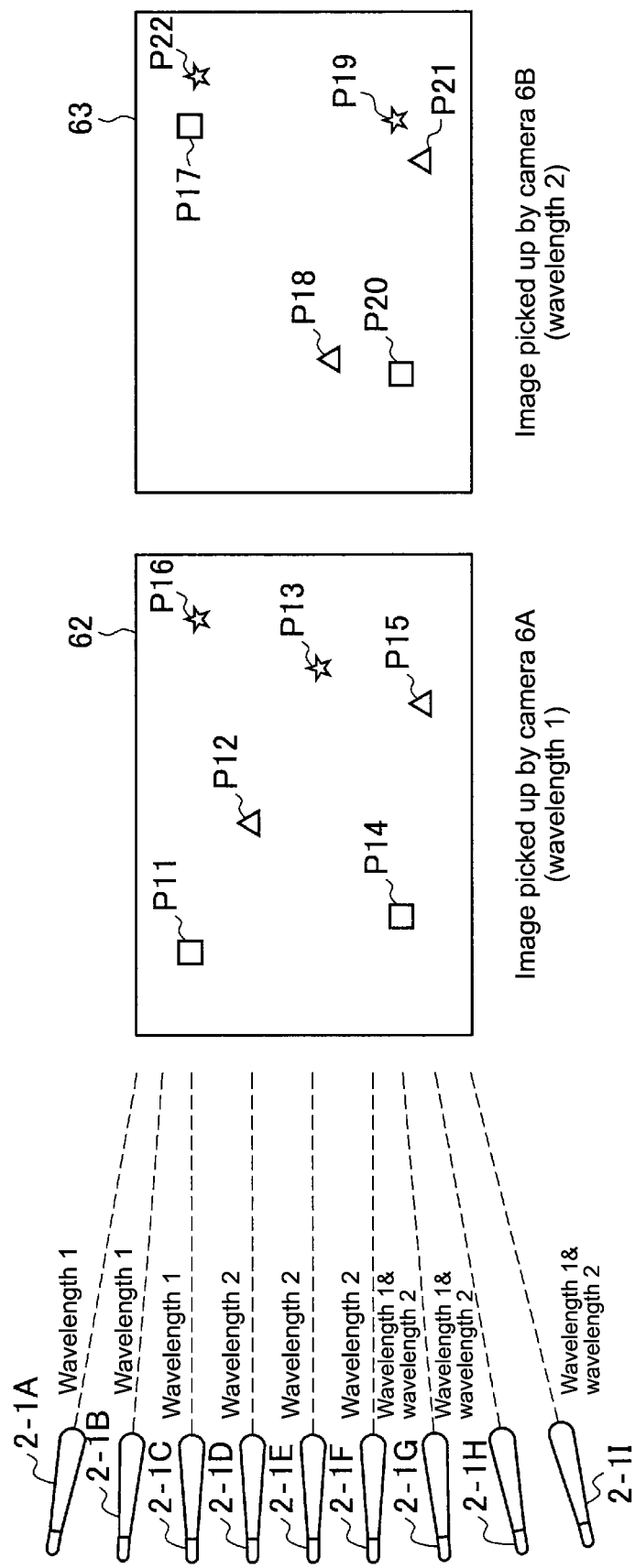
FIG. 12 is a diagram describing a case of distinguishing nine input devices by using two types of wavelengths in the first embodiment.

For example, by using the mark shape of the pointer, the size of the mark, the orientation of the mark, the position of a point light source, a character by a linear light source, or the like, it is possible to further increase the number of input devices to be distinguished. FIG. 12 is a diagram describing a case of distinguishing nine input devices by using two types of wavelengths.

In the example shown in FIG. 12, the input devices 2-1A to 2-1C that emit light with the wavelength 1 respectively apply first to third marks, the input devices 2-1D to 2-1F that emit light with the wavelength 2 respectively apply the first to third marks, and the input device 2-1G and input devices 2-1H and 2-1I that emit light with the wavelength 1 and the wavelength 2 respectively apply the first to third marks.

The determination unit 102 distinguishes the input devices 2-1 on the basis of positions and mark shapes of pointer coordinate pairs P11 to P16 of an image 62 picked up by the camera 6A with a band-pass filter of the wavelength 1 and pointer coordinate pairs of P17 to P22 of an image 63 picked up by the camera 6B with a band-pass filter of the wavelength 2. The light emission wavelength and the mark shape of each of the input devices 2-1 are stored in, for example, the storage unit 14 in advance.

For example, the determination unit 102 is capable of determining, by using the differences of the corresponding wavelengths and corresponding mark shapes, the input devices 2-1A to 2-1C relating to the pointer coordinate pairs P11 to P13 in the image 62 and the input devices 2-1D to 2-1F relating to the pointer coordinate pairs P17 to P19 in the image 63, respectively. Further, since the pointer coordinate pairs P14 to P16 of the image 62 are substantially the same as the pointer coordinate pairs P20 to P22 of the image 63 and the mark shapes of the pointer coordinate pairs P14 to P16 are the same as those of the pointer coordinate pairs P20 to P22, respectively, the determination unit 102 is capable of determining the input devices 2-1G to 2-1I corresponding thereto.

(Features During Swinging)

The determination unit 102 is capable of recognizing the differences on the basis of the state of the light emission trajectory of the pointer to distinguish the input devices even during swinging the input devices 2. When the pointer is stationary, each mark shape can be recognized as shown in FIG. 12. However, during swinging, since the pointer gets blurry depending on the exposure time period, the light emission trajectory differs depending on the different mark shapes and the size of the marks. The determination unit 102 is capable of determining the corresponding input devices 2 on the basis of the pointer features such as the thickness or main line of the light emission trajectory and which direction it is swung.

(State of Mark)

Further, it is possible to determine the corresponding input device 2-1 also by making the brightness values of IR emitted from the input devices 2-1 different (that is, difference of brightness).

Further, it is possible to determine the corresponding input device 2-1 also by using the difference of blinking patterns obtained by blinking IR emitted from the input devices 2-1.

(Use of High Frame Rate Camera)

Even in the case of using a single wavelength, the information processing apparatus 1 is capable of distinguishing a plurality of input devices 2-1 by synchronizing the light emission timing of the input device 2-1 and the shutter timing of the camera 6 with each other so that respective pointers are imaged only in predetermined number (e.g., multiple)-th frames. Hereinafter, this will be specifically described with reference to FIG. 13.

Figure 13:
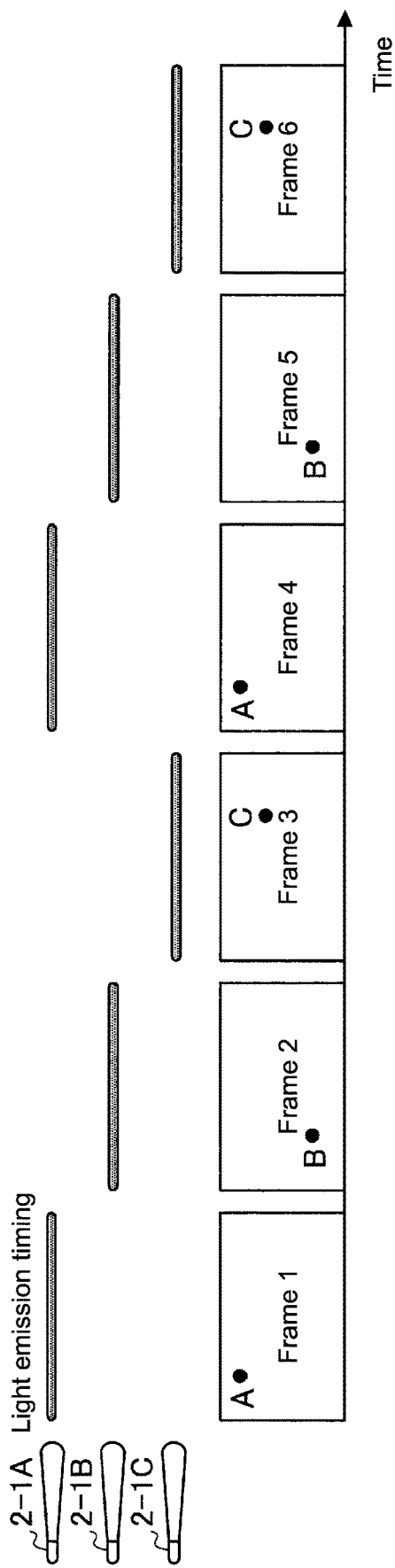
FIG. 13 is a diagram describing a method of distinguishing input devices in the case of using a high frame rate camera in the first embodiment.

FIG. 13 is a diagram describing a method of distinguishing the input devices in the case of using a high frame rate camera in this embodiment. The information processing apparatus 1 performs control so that respective pointers are imaged only in predetermined number (e.g., multiple)-th frames as shown in FIG. 13 by synchronizing the light emission timing of each input device 2-1 and the imaging timing of the display screen by the camera 6 with each other. Accordingly, the determination unit 102 of the information processing apparatus 1 is capable of determining that a pointer A imaged in a frame 1 obtained at the light emission timing of the input device 2-1A corresponds to the input device 2-1A, and that a pointer B imaged in a frame 2 obtained at the light emission timing of the input device 2-1B corresponds to the input device 2-1B, for example.

(Combination in Each Method)

It is also possible to further increase the number of input devices 2-1 to be distinguished by using the combination of patterns in each of the above-mentioned methods. For example, the combination of a plurality of wavelengths described in the above-mentioned embodiment is conceivable.

(Combination of Different Methods)

It is also possible to further increase the number of input devices 2-1 to be distinguished by combining the above-mentioned different methods. For example, in the case of using two types of IR wavelengths, it is possible to distinguish further many people by combining many distinguishing methods using the mark shape, size, brightness, blinking, and the like.

4. Second Embodiment

Next, an information processing apparatus according to a second embodiment will be described with reference to FIG. 14 to FIG. 20. In this embodiment, an input device 2-2 having an IR emission function is further provided with a sensor that detects movement, posture, or the like, and the input devices 2-2 corresponding to respective pointers are distinguished on the basis of movement of the input devices 2-2 and the image of the display screen picked up by the camera 6.

<4-1. Configuration of Input Device>

Figure 14:
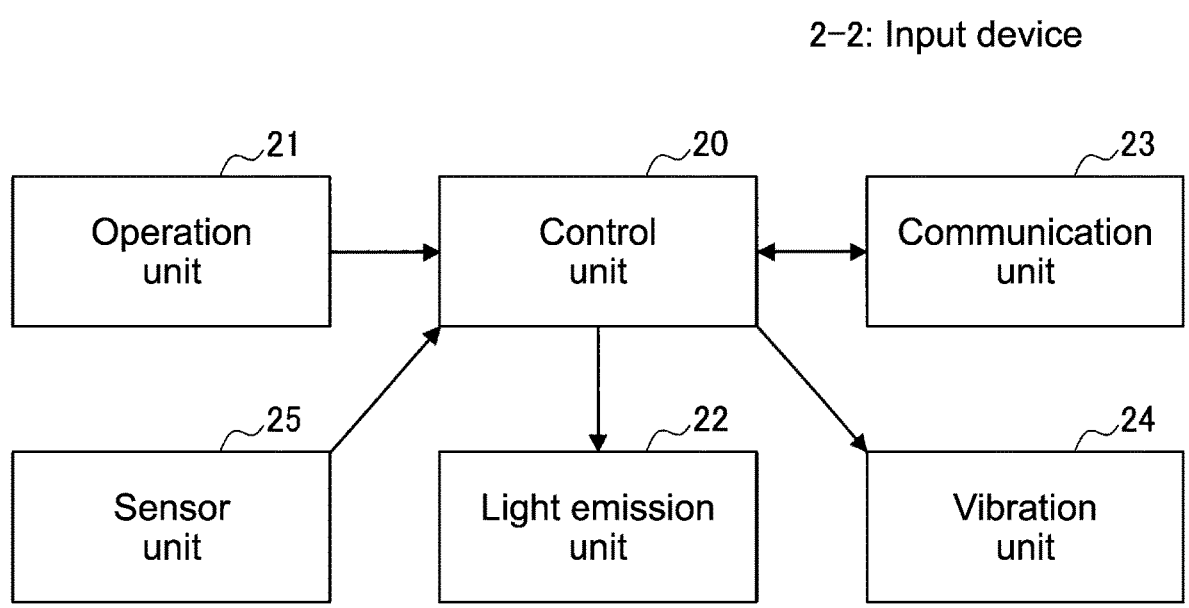
FIG. 14 is a block diagram showing an example of a configuration of an input device in a second embodiment.

FIG. 14 is a block diagram showing an example of a configuration of the input device 2-2 in this embodiment. As shown in FIG. 14, the input device 2-2 includes the control unit 20, the operation unit 21, the light emission unit 22, the communication unit 23, the vibration unit 24, and a sensor unit 25. Note that components different from those of the input device 2-1 in the first embodiment will be described, and description of common components will be omitted.

The control unit 20 performs control so that sensor information detected by the sensor unit 25 is transmitted to the information processing apparatus 1 via the communication unit 23, in addition to the control of the light emission unit 22 and the vibration unit 24.

The sensor unit 25 is a sensor that detects movement or posture of the input device 2-2, and may be, for example, a six-axis sensor (specifically, an acceleration sensor and a gyro sensor) and a posture sensor (specifically, a geomagnetic sensor). Note that the six-axis sensor and the posture sensor are an example of the sensor unit 25, and this embodiment is not limited thereto. For example, at least any one of an acceleration sensor, a gyro sensor, and a geomagnetic sensor may be used, and a velocity sensor, a vibration sensor, or the like may be further used.

<4-2. Operational Processing>

Figure 15:
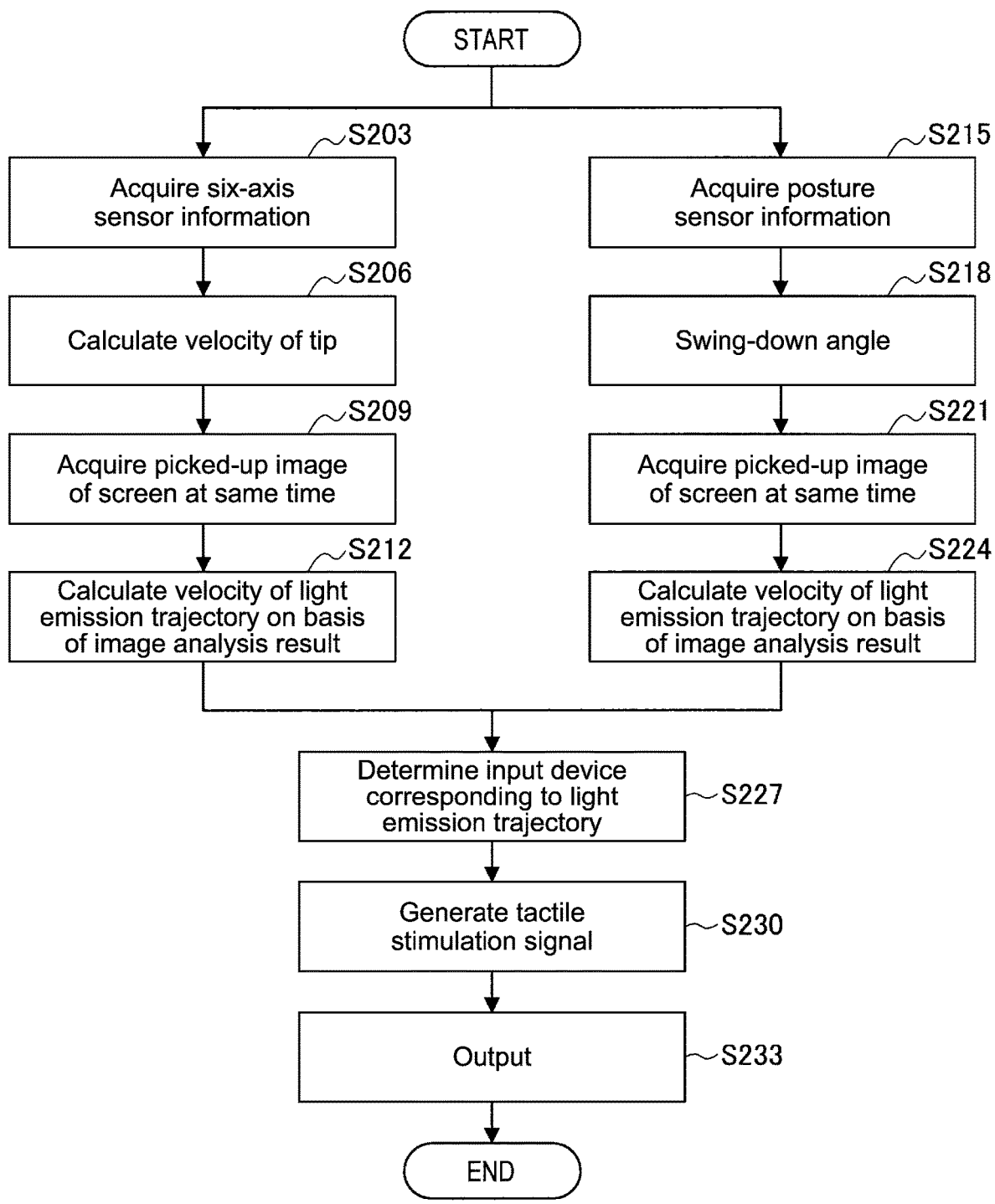
FIG. 15 is a flowchart showing operational processing in the second embodiment.

Next, operational processing in this embodiment will be described. FIG. 15 is a flowchart showing operational processing in this embodiment.

Figure 16:
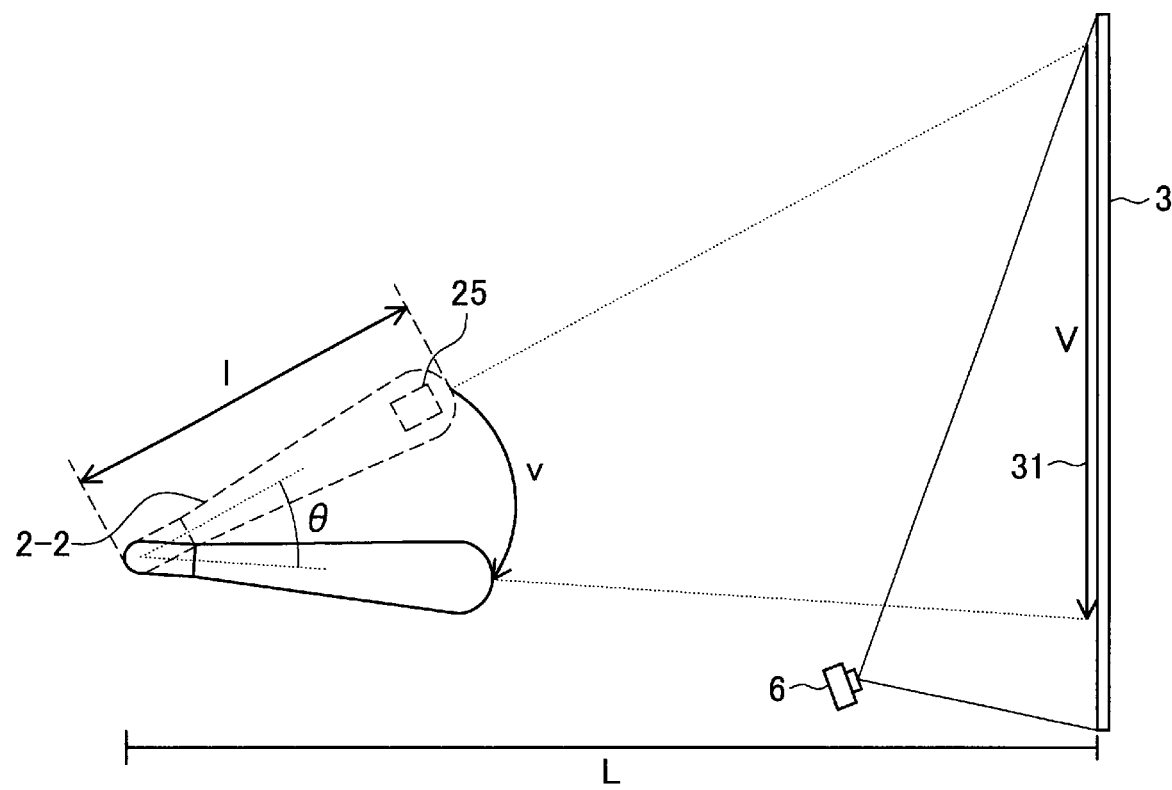
FIG. 16 is a diagram describing velocity calculation in a distinguishing method in the second embodiment.

As shown in FIG. 15, first, the information processing apparatus 1 acquires six-axis sensor information detected by the sensor unit 25 provided to the tip of the input device 2-2 (Step S203), and calculates a velocity v of the tip of the input device 2-2 by the determination unit 102. The input device 2-2 continuously transmits the sensor information detected by the sensor unit 25 to the information processing apparatus 1. FIG. 16 is a diagram describing the velocity calculation in the distinguishing method in this embodiment. As shown in FIG. 16, the sensor unit 25 is provided to the tip of the input device 2-2. The user swings the input device 2-2 imitating the shape of a weapon such as a club to attack a stereoscopic object (not shown in FIG. 16) in front of his/her eyes, which is projected on the screen 3, for example. At this time, the determination unit 102 calculates the velocity v of the tip of the input device 2-2 by the following formula on the basis of the six-axis sensor information (specifically, angular velocity) and a length l of the input device 2-2.

$$v = \frac{\Delta l \theta}{\Delta t}$$ [Math. 2]

Next, the information processing apparatus 1 acquires, from the camera 6, an image of the screen 3 picked up at substantially the same time as the time when the six-axis sensor information, which is used when calculating the velocity of the tip, is detected (Step S209).

Next, the determination unit 102 calculates the velocity v of a light emission trajectory on the basis of the analysis result by the information analysis unit 101 of the acquired picked-up image (Step S212). As shown in FIG. 16, since IR is emitted from the tip of the input device 2-2, a light emission trajectory 31 is generated by the IR on the screen 3 when the user swings down the input device 2-2 with respect to the screen 3. The determination unit 102 calculates the velocity v of the light emission trajectory on the basis of the length (length from the start point to the end point) and time period (time period during the pointer moves from the start point to the end point) of the light emission trajectory 31 in the IR picked-up image at the swing-down timing.

Meanwhile, the information processing apparatus 1 acquires posture sensor information at the same time (timing when the user swings down the input device 2-2) (Step S215), which is detected by the sensor unit 25 provided to the tip of the input device 2-2, and calculates a swing-down angle φ of the tip of the input device 2-2 by the determination unit 102.

Next, the information processing apparatus 1 acquires, from the camera 6, an image of the screen 3 picked up at substantially the same time as the time when the posture sensor information, which is used when calculating the swing-down angle information is detected (Step S221).

Next, the determination unit 102 calculates an angle φ of the light emission trajectory on the basis of the analysis result by the information analysis unit 101 of the acquired picked-up image (Step S224).

Figure 17:
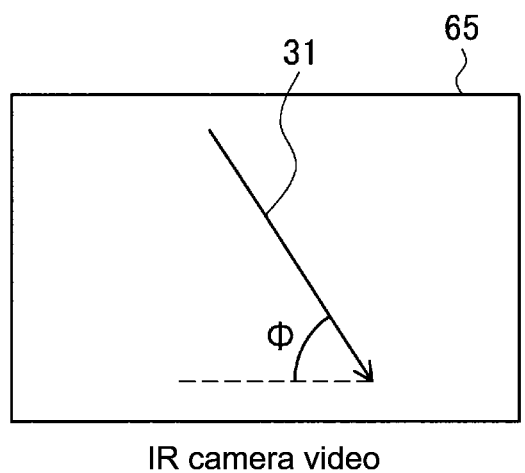
FIG. 17 is a diagram describing angle calculation in the distinguishing method in the second embodiment.
Figure 17:
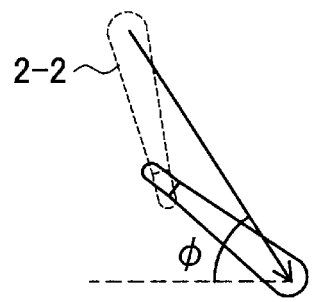

FIG. 17 is a diagram describing angle calculation in the distinguishing method in this embodiment. As shown in the upper part of FIG. 17, the light emission trajectory 31 is imaged in an IR camera image 65 picked up by the camera 6. The determination unit 102 is capable of calculating the angle φ of the light emission trajectory 31 at the time of swing-down on the basis of the image analysis result. Further, the lower part of FIG. 17 shows a view seen from behind when the user swings down the input device 2-2. The determination unit 102 calculates the swing-down angle φ of the tip of the input device 2-2 on the basis of the posture sensor information detected by the sensor unit 25 provided to the input device 2-2.

Next, the determination unit 102 determines the input device 2-2 corresponding to the light emission trajectory on the basis of the velocity of the tip of the input device 2-2 and the velocity of the light emission trajectory 31 at the time of the operation of the input device 2-2 and the angle of the tip of the input device 2-2 and the angle of the light emission trajectory 31 at the time of the operation of the input device 2-2 (Step S227). In FIG. 16 and FIG. 17, only one input device 2-2 and one light emission trajectory 31 are shown for convenience of description. However, it is expected that since actually many users hold the input devices 2-2 and operate the input devices 2-2 by swinging them with respect to the stereoscopic object 30 projected on the screen 3 as shown in FIG. 1 and FIG. 2, many light emission trajectories 31 are generated in the IR camera image 65 of the screen 3 at the same time. The determination unit 102 compares the velocity and the angle at the time of the operation of the input devices 2-2 with the velocity and the angle of the light emission trajectories to determine the input device 2-2 corresponding to the light emission trajectory. More specifically, for example, in the case of satisfying the following formula, the determination unit 102 determines that the input device 2-2 and the light emission trajectory correspond to each other. The left side of the following formula is based on that the velocity v of the light emission trajectory 31 depending on the velocity v of the tip of the input device 2-2 can be estimated by taking into account the distance from a user position to the screen 3 in the case where the range of the user position is known in advance.

$$\left|V - \frac{L}{l}v\right| < \varepsilon_1 \text{ AND } |\Phi - \varphi| < \varepsilon_2 \qquad \text{[Math. 3]}$$

Next, in the case where the position or motion of the determined light emission trajectory satisfies a predetermined condition, the output signal generation unit 103 of the information processing apparatus 1 generates a predetermined tactile stimulation signal to be output to the input device 2-2 corresponding to the light emission trajectory (Step S230). For example, in the case where the light emission trajectory overlaps with the stereoscopic object 30, the output signal generation unit 103 generates a tactile stimulation signal that causes the user to perceive that the input device 2-2 comes into contact with the stereoscopic object 30.

Then, the information processing apparatus 1 transmits the generated tactile stimulation signal from the communication unit 11 to the target input device 2-2, and causes the input device 2-2 to output the tactile stimulation (Step S233).

The operational processing in the second embodiment has been specifically described heretofore. Note that although the accuracy of determination is increased by using both conditions of the velocity and the angle in the above-mentioned operational processing, this embodiment is not limited thereto, and it is possible to perform the determination by using only any one of the conditions.

Further, as the distinguishing method based on the operation velocity of the input device, it is also possible to calculate a velocity v' that does not depend on the length l to determine the corresponding input device 2-2. Hereinafter, this will be described with reference to FIG. 18.

Figure 18:
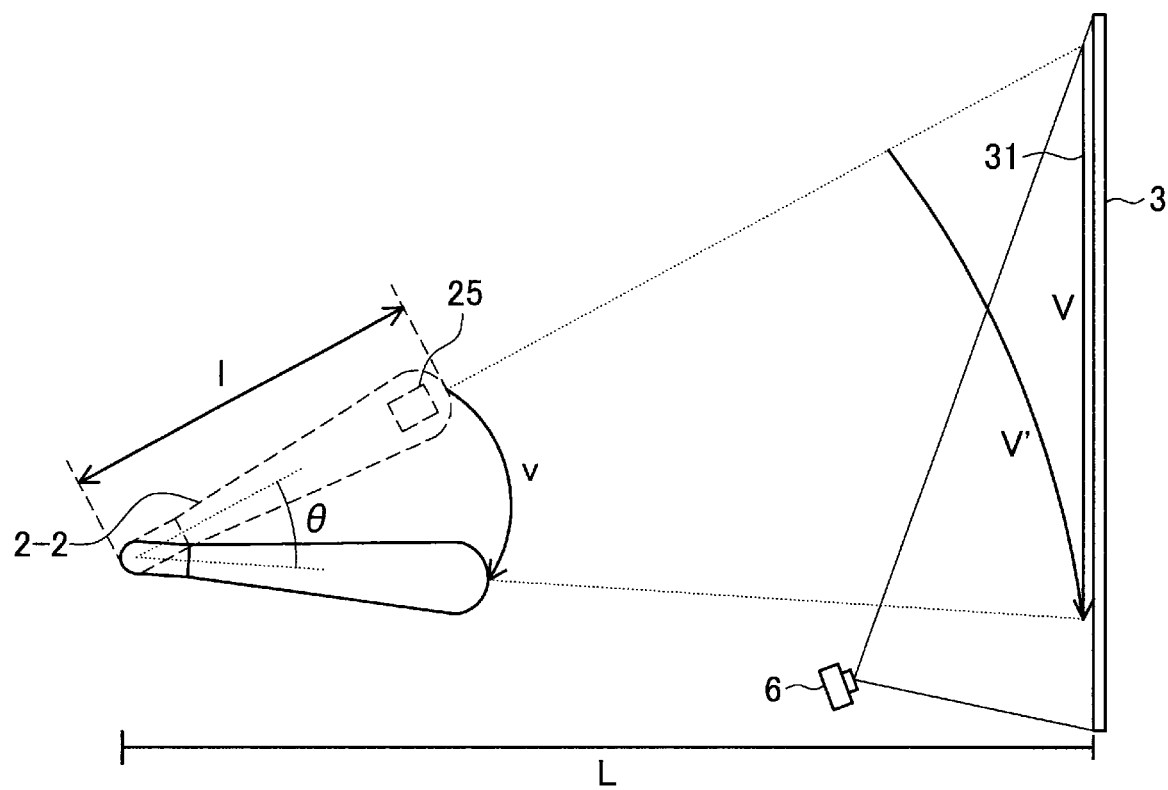
FIG. 18 is a diagram describing another example of velocity calculation in the distinguishing method in the second embodiment.

FIG. 18 is a diagram describing another example of the velocity calculation in the distinguishing method in this embodiment. As shown in FIG. 18, taking into account a distance L from the user position to the screen 3 in the case where the range of the user position is known and six-axis sensor information (specifically, angular velocity) detected by the sensor unit 25 provided to the input device 2-2, the determination unit 102 obtains the velocity v' that does not depend on the length of the input device 2-2 by using the following formula.

$$V' = \frac{\Delta\theta}{\Delta t}L \qquad \text{[Math. 4]}$$

Then, in the case of satisfying the following formula at the same time, the determination unit 102 determines that the input device 2-2 and the light emission trajectory correspond to each other.

$$\left|V - \frac{L}{l}v\right| < \varepsilon_1 \text{ OR } |V - V'| < \varepsilon_2 \qquad \text{[Math. 5]}$$

<4-3. First Modified Example>

Although a distinguishing method using sensor information detected by the sensor unit 25 of the input device 2-2 has been described is the example described above, this embodiment is not limited thereto. For example, by preparing an IR camera that images a user and using an image picked up by the IR camera, it is possible to determine an input device corresponding to the light emission trajectory without using sensor information obtained by the sensor unit 25. Hereinafter, this will be described with reference to FIG. 19 and FIG. 20.

Figure 19:
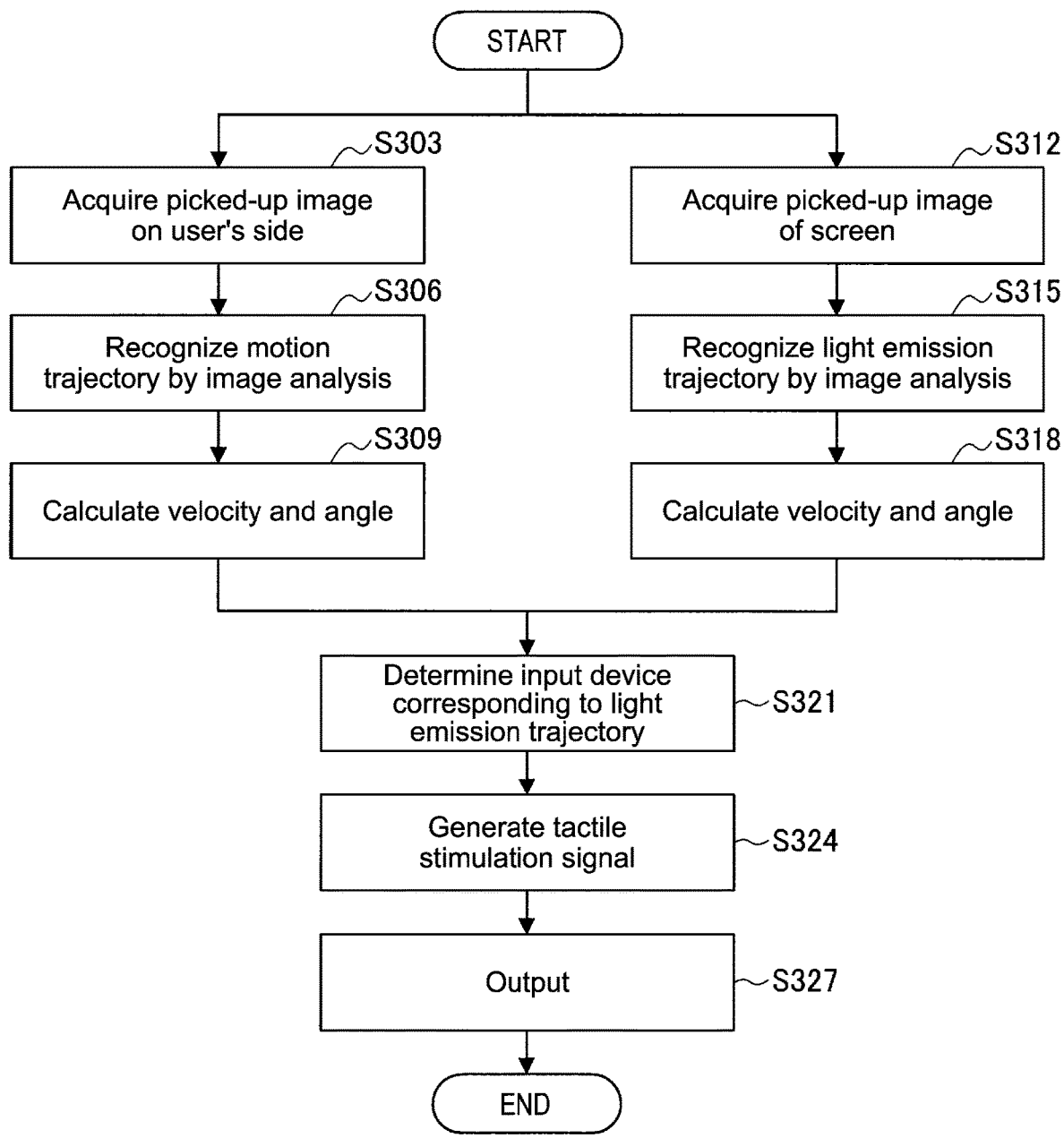
FIG. 19 is a flowchart showing operational processing in a first modified example of the second embodiment.
Figure 20:
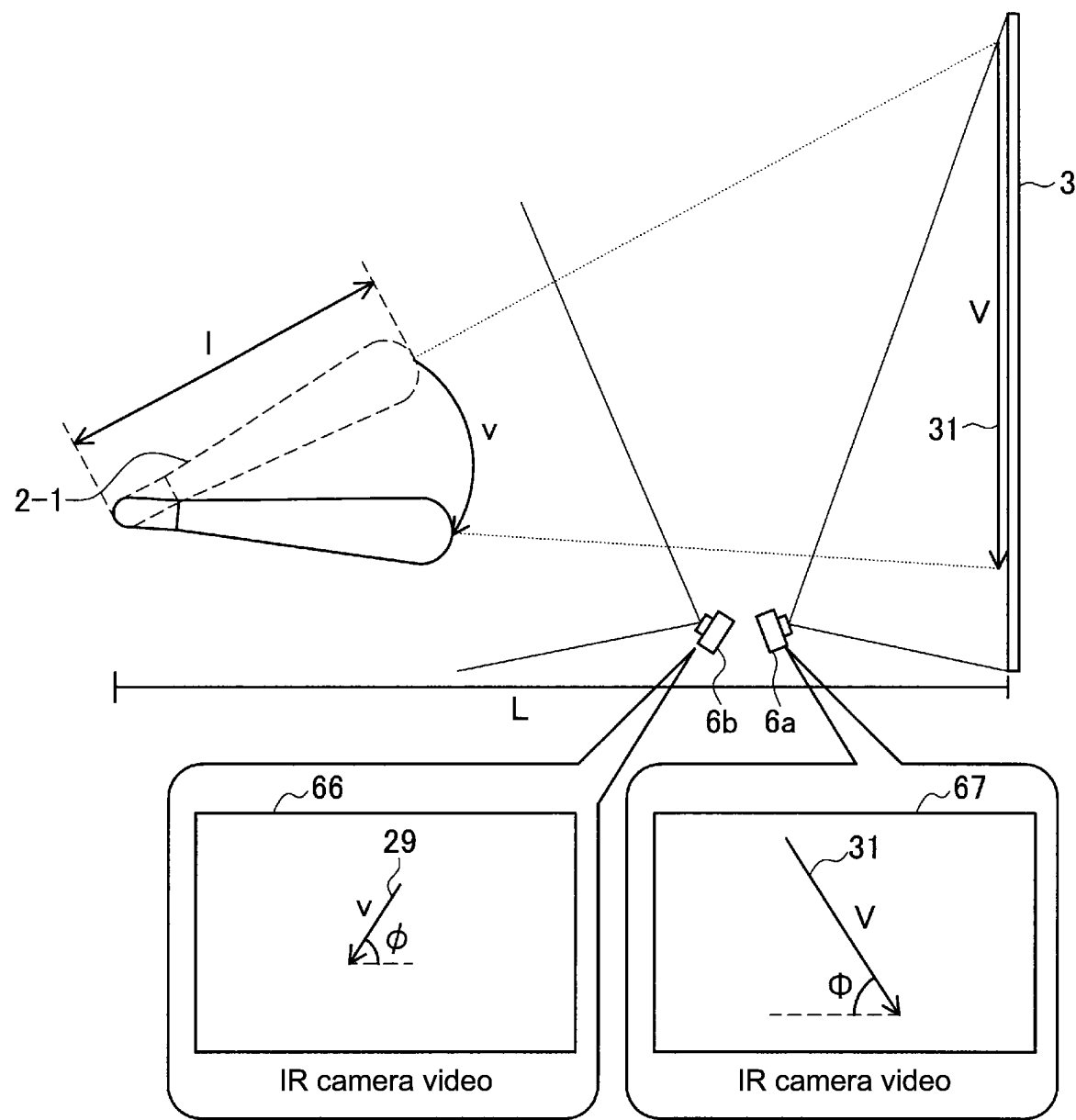
FIG. 20 is a diagram describing velocity calculation and angle calculation in a distinguishing method in the first modified example of the second embodiment.

FIG. 19 is a flowchart showing operational processing in a first modified example of the second embodiment. As shown in FIG. 19, first, the information processing apparatus 1 acquires an image (IR camera image 67) picked up by a camera 6b (e.g., IR camera) that images movement of a user from the front (Step S303). FIG. 20 is a diagram describing velocity calculation and angle calculation in a distinguishing method in this modified example. As shown in FIG. 20, in this modified example, a camera 6a (IR camera) that images the screen 3 and the camera 6b (IR camera) that images the movement of the user (i.e., movement of the input device 2-1) from the front are placed. The configuration of the input device 2-1 is similar to that in the first embodiment described with reference to FIG. 8. To the tip of the input device 2-1, the light emission unit 22 that emits IR is provided.

Next, the information analysis unit 101 analyzes the picked-up image (IR camera image 66) acquired from the camera 6b, and recognizes the motion trajectory of the input device 2-1 (Step S306). The motion trajectory of the input device 2-1 is the trajectory of the tip of the input device 2-1, for example.

Next, the determination unit 102 calculates the velocity and angle of the motion trajectory on the basis of the image analysis result (Step S309). Specifically, as shown in FIG. 20, the determination unit 102 calculates the velocity v and the angle φ of a motion trajectory 29 recognized from the IR camera image 66.

Meanwhile, the information processing apparatus 1 acquires an image picked up by the camera 6a (IR camera) that images the display screen of the screen 3 (Step S312).

Next, the information analysis unit 101 analyzes the picked-up image acquired from the camera 6a, and recognizes the light emission trajectory (Step S315).

Next, the determination unit 102 calculates the velocity and angle of the light emission trajectory on the basis of the image analysis result (Step S318). Specifically, as shown in FIG. 20, the determination unit 102 calculates the velocity v and the angle φ of the light emission trajectory 31 recognized from the IR camera image 67.

Next, the determination unit 102 determines the input device 2-1 corresponding to the light emission trajectory on the basis of the velocity of the tip of the input device 2-1 (i.e., velocity of the motion trajectory 29) and the velocity of the light emission trajectory 31 at the time of the operation of the input device 2-1 and the angle of the tip of the input device 2-1 (i.e., angle of the motion trajectory 29) and the angle of the light emission trajectory 31 at the time of the operation of the input device 2-1 (Step S321). In FIG. 20, only one input device 2-1 and one light emission trajectory 31 are shown for convenience of description. However, it is expected that since actually many users hold the input devices 2-1 and operate the input devices 2-1 by swinging them with respect to the stereoscopic object 30 projected on the screen 3 as shown in FIG. 1 and FIG. 2, many light emission trajectories 31 are generated in the IR camera image 67 of the screen 3 at the same time. The determination unit 102 compares the velocity and angle of the motion trajectory of the input devices 2-1 with the velocity and angle of the light emission trajectories to determine the input device 2-1 corresponding to the light emission trajectory.

The camera 6b may be placed for each user. Alternatively, multiple people may be collectively imaged. In the case where positions of the users are mostly determined, which motion trajectory corresponds to which input device can be determined on the basis of the order of arrangement, for example.

Regarding determination of the input device 2-1 corresponding to the light emission trajectory, more specifically, for example, the determination unit 102 determines that the input device 2-1 and the light emission trajectory 31 correspond to each other in the case where the velocity and the angle satisfy the following formula. The left side of the following formula is based on that the velocity v of the light emission trajectory 31 depending on the velocity v of the tip of the input device 2-1 can be estimated by taking into account the distance L from a user position to the screen 3 in the case where the range of the user position is known in advance.

$$\left|V - \frac{L}{l}v\right| < \varepsilon_1 \text{ AND } |\Phi - \varphi| < \varepsilon_2 \qquad \text{[Math. 6]}$$

Next, in the case where the position or movement of the determined light emission trajectory satisfies a predetermined condition, the output signal generation unit 103 of the information processing apparatus 1 generates a predetermined tactile stimulation signal to be output to the input device 2-1 corresponding to the light emission trajectory (Step S324). For example, in the case where the light emission trajectory overlaps with the stereoscopic object 30, the output signal generation unit 103 generates a tactile stimulation signal that causes the user to perceive that the input device 2-1 comes into contact with the stereoscopic object 30.

Then, the information processing apparatus 1 transmits the generated tactile stimulation signal from the communication unit 11 to the target input device 2-1, and causes the input device 2-1 to output the tactile stimulation (Step S327).

<4-4. Second Modified Example>

Although an IR image picked up by the camera 6 that images the screen 3 is analyzed to recognize the light emission trajectory on the screen 3 in the example described above, this embodiment is not limited thereto. For example, by arranging IR sensors around the screen 3, the light emission trajectory on the screen 3 can be estimated without using the camera 6 that images the screen 3 on the basis of the detection results of the IR sensors. Hereinafter, this will be specifically described with reference to FIG. 21 to FIG. 25.

Figure 21:
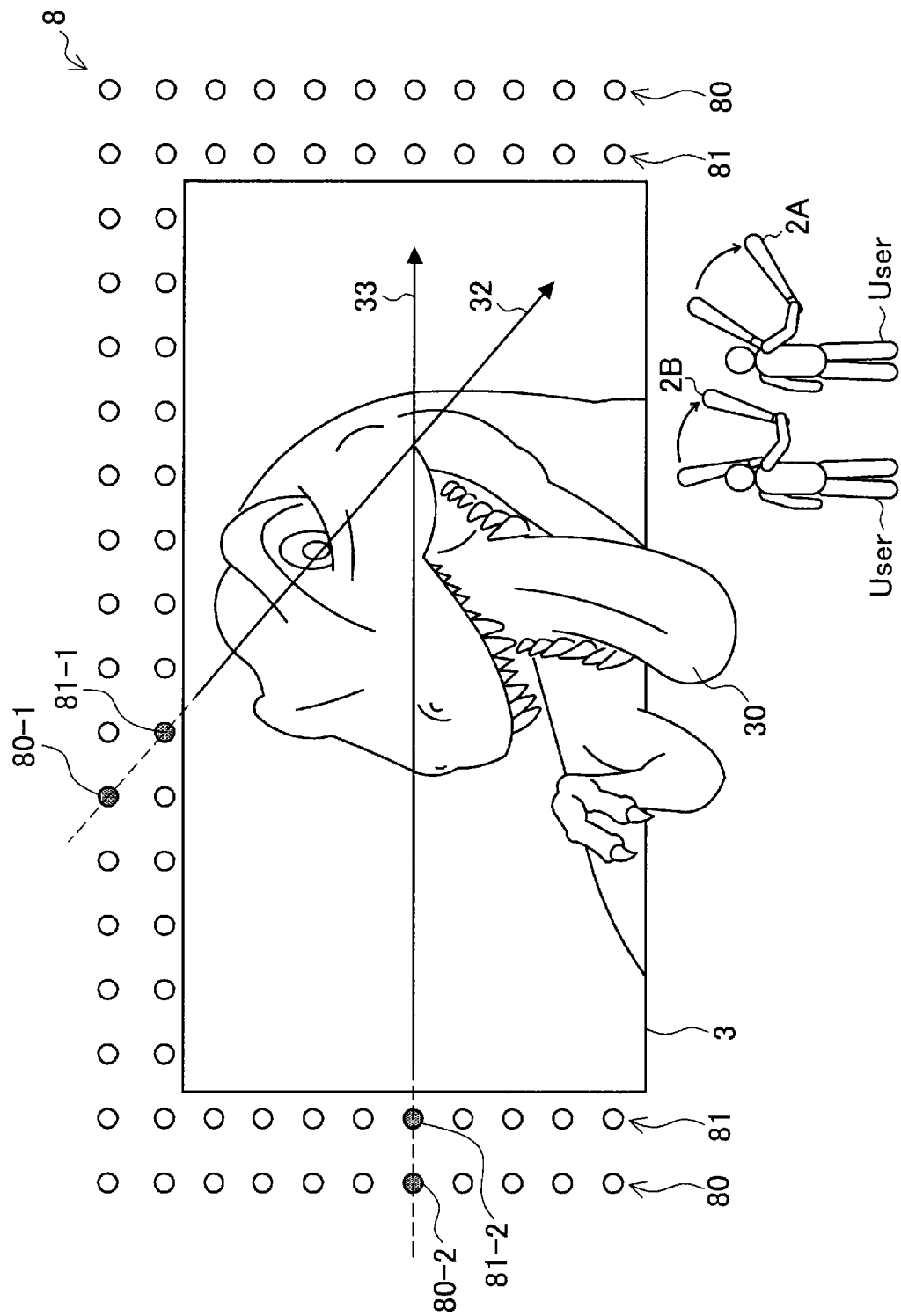
FIG. 21 is a diagram describing an overview of a second modified example of the second embodiment.

FIG. 21 is a diagram describing an overview of this modified example. As shown in FIG. 21, IR sensors 8 are arranged around the screen 3. The IR sensors 8 are arranged in two columns around the screen 3, and the two columns include an outer IR sensor column 80 and an inner IR sensor column 81, for example. Further, in the example shown in FIG. 21, the IR sensor column 80 and the IR sensor column 81 are arranged on the upper side and both right and left sides of the screen. Each of the IR sensors transmits the detection result to the information processing apparatus 1.

When a user swings an input device 2A that emits IR, with respect to the screen 3, for example, the emitted IR is sequentially detected by an outer IR sensor 80-1 and an inner IR sensor 81-1 on the upper side. In this case, the control unit 10 of the information processing apparatus 1 estimates that a light emission trajectory 32 is generated on an extension line of a line that connects the outer IR sensor 80-1 and the inner IR sensor 81-1.

Further, when another user swings an input device 2B with respect to the screen 3, for example, the emitted IR is sequentially detected by an outer IR sensor 80-2 and an inner IR sensor 81-2 on the left side. In this case, the control unit 10 of the information processing apparatus 1 estimates that a light emission trajectory 33 is generated on an extension line of a line that connects the outer IR sensor 80-2 and the inner IR sensor 81-2.

A case where the IR emitted from the input device 2 is sequentially detected by an inner IR sensor 81-$n$ and an outer IR sensor 80-$n$ after going across the screen 3 is also assumed. Further, it is considered that in the case where the time period from when it is detected by the outer IR sensor 80-$n$ to when it is detected by the inner IR sensor 81-$n$ is long and the movement of the input device 2 is too slow, it is not an operation such as an attack on the stereoscopic object 30. In this regard, in the case where a detection time t1 by the outer IR sensor 80-$n$ and a detection time t2 by the inner IR sensor 81-$n$ satisfy the following formula, the control unit 10 may estimate the light emission trajectory by regarding that the IR enters from the side on which these IR sensors are arranged.

$$0 < t2 - t1 < Tth$$

By using the IR sensors 8 arranged around the screen 3 as described above, the light emission trajectory can be estimated more accurately because it is based on not the reflected light of the IR from the screen but the result of directly detecting the IR.

Further, regarding determination of the input device 2 corresponding to the estimated light emission trajectory, for example, by comparing the velocity (that can be detected by the six-axis sensor of the input device 2 or calculated by analyzing the image of the user) of the input device 2 and the velocity of the light emission trajectory, the corresponding input device 2 is determined in the case of satisfying the left side of the formula shown in "Math. 3" or the left side of the formula shown in "Math. 6".

Figure 22:
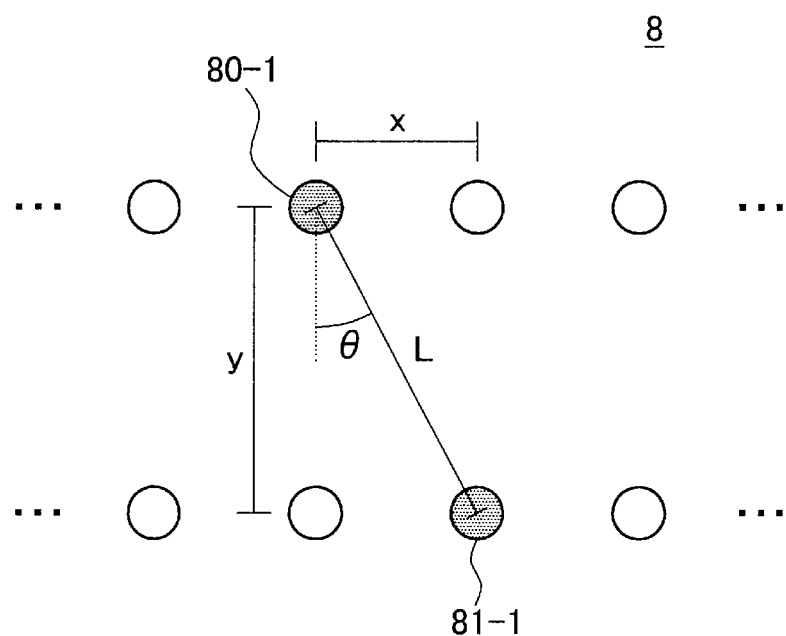
FIG. 22 is a diagram describing calculation of the estimated velocity of a light emission trajectory in this modified example.

Now, the calculation of the velocity of the estimated light emission trajectory will be described with reference to FIG. 22. In the case where it is sequentially detected by the outer IR sensor 80-1 and the inner IR sensor 81-1 as shown in FIG. 22, the velocity v obtained by the following formula is estimated as the velocity of the light emission trajectory. In the following formula, t1 represents a detection time by the outer IR sensor 80-1, t2 represents a detection time by the inner IR sensor 81-1, x represents a separation distance between the outer IR sensor 80-1 and the inner IR sensor 81-1 in the horizontal direction as shown in FIG. 22, y represents a separation distance between the outer IR sensor 80-1 and the inner IR sensor 81-1 in the vertical direction, and a distance L represents a linear distance between the outer IR sensor 80-1 and the inner IR sensor 81-1.

Time $T = t_2 - t_1$

Angle $\theta = \arctan(x/y)$

Distance $L = \sqrt{x^2 + y^2}$

Velocity $v = L/T$ [Math. 7]

Figure 23:
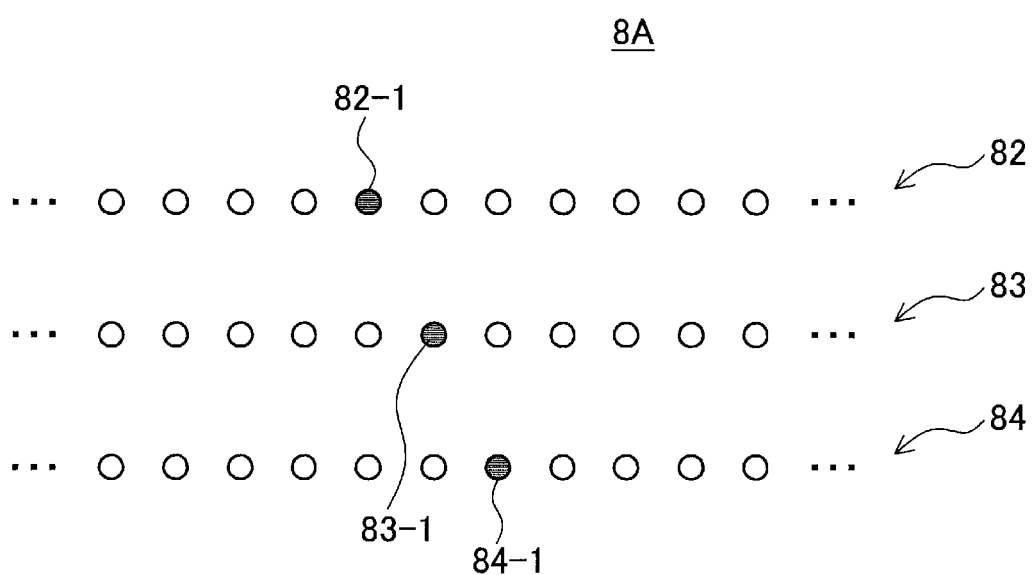
FIG. 23 is a diagram describing another example of arrangement of IR sensors in this modified example.

Further, the arrangement of the IR sensors 8, which are arranged around the screen 3, is not limited to the example shown in FIG. 21. For example, as shown in FIG. 23, the IR sensors 8 may be arranged in three or more columns. In FIG. 23, IR sensors 8A including an outer IR sensor column 82, a center IR sensor column 83, and inner IR sensor column 84 are shown. In this case, IR is sequentially detected by an outer IR sensor 82-1, a center IR sensor 83-1, and an inner IR sensor 84-1, and it is estimated that the light emission trajectory is on an extension line of a line that connects these IR sensors. Note that since detection of at least two columns is necessary to estimate the light emission trajectory, by arranging the IR sensors in three or more columns, it is possible to estimate the light emission trajectory even in the case where detection of any of the columns fails.

Figure 24:
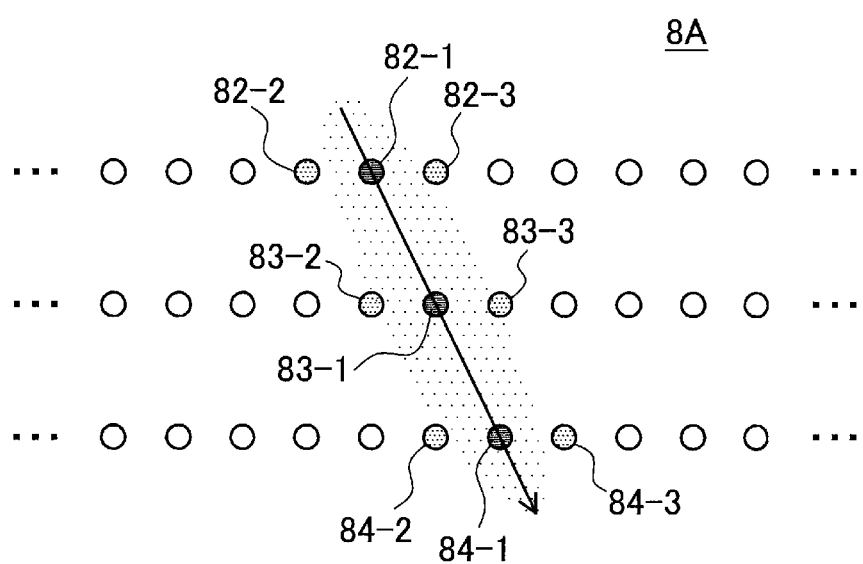
FIG. 24 is a diagram describing a case where a plurality of IR sensors detect IR at the same time.

FIG. 24 is a diagram describing a case where a plurality of IR sensors detect IR at the same time. For example, it is expected that in the case where IR passes through the IR sensors 8A in three columns at a sufficient fast velocity, the IR is detected by a plurality of IR sensors 82-1, 83-1, and 84-1 at the same time as shown in FIG. 24. Further, it is expected that in the case where the radiation size is large, the IR is detected also by surrounding IR sensors 82-2, 82-3, 83-2, 83-3, 84-2, and 84-3 as shown in FIG. 24. In this case, the control unit 10 of the information processing apparatus 1 is capable of estimating the light emission trajectory by determining the central axis from the intensity distribution on the basis of the detection results of the IR sensors.

Figure 25:
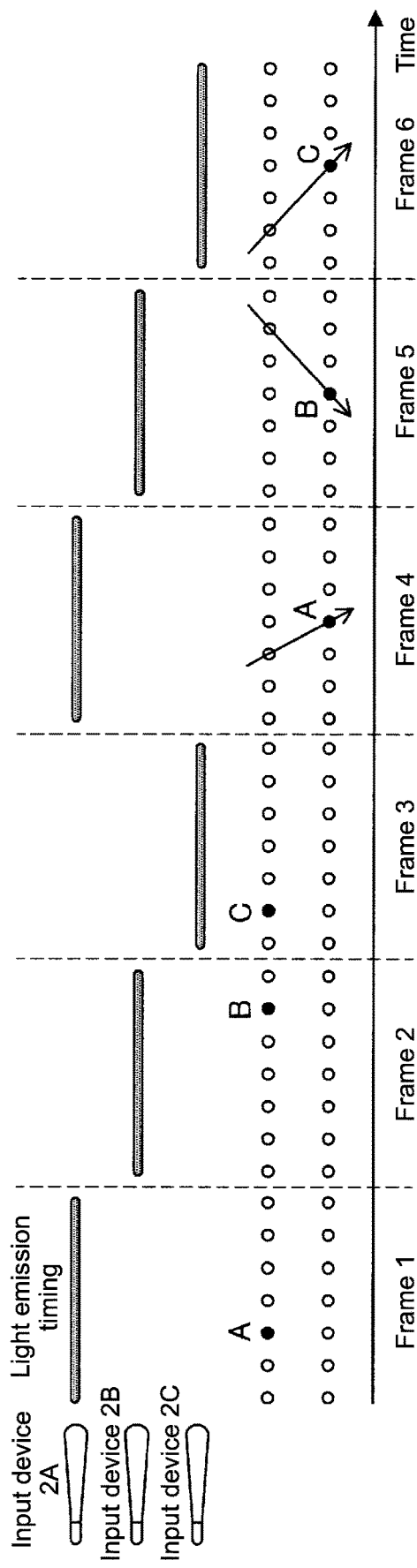
FIG. 25 is a diagram describing synchronization control of light emission timing and detection timing in this modified example.

FIG. 25 is a diagram describing synchronization control of light emission timing and detection timing. In this modified example, by synchronizing the IR emission timing of the input device 2 and the IR detection timing of the IR sensor 8 with each other so that the IR from each input device 2 is detected at only specific timing, it is possible to distinguish multiple people (distinguish a plurality of input devices 2) even with a single wavelength. For example, the control unit 10 of the information processing apparatus 1 determines that the detection result of the IR sensor acquired at the light emission timing of the input device 2A corresponds to the input device 2A and the detection result of the IR sensor acquired at the light emission timing of the input device 2B corresponds to the input device 2B. Then, for example, when acquiring detection results of the outer IR sensor and the inner IR sensor corresponding to the input device 2A, the control unit 10 estimates that the light emission trajectory of the input device 2A is on an extension line of a line that connects these IR sensors.

Although IR sensor are used as an example of the sensor that detects invisible light in the second modified example described above, this embodiment is not limited thereto, and other sensors capable of detecting light emitted from the input device 2 may be arranged.

5. Supplementary Note

Next, an information processing system according to an embodiment of the present disclosure will be additionally described.

Although a case where invisible light such as infrared rays are emitted as an input of the input device 2 has been described in the above-mentioned embodiment, the present disclosure is not limited thereto, and the light source may be a visible light source or a sound source having directivity. In the case where visible light is emitted, since the user can see where on the screen the input device 2 of his/her own is applying the visible light, the screen is affected and the user can feel the feedback.

The light source or sound source from the input device 2 may be output only during when the user operates the input device 2 by the operation unit 21 provided to the input device 2 and the input is on.

As the usage of this information processing system, a case where multiple people share one display screen or a specific area or object (including a real object) is assumed.

The determination unit 102 is capable of determining the input device also by estimating the projection direction (incidence angle) with respect to the screen 3 on the basis of the reflection strength on the screen 3. Specifically, when making the brightness (brightness values) of the input devices 2 different to determine the corresponding input device 2 by using the difference of brightness, the determination unit 102 is capable of determining the input device on the basis of the reflection strength and the projection direction on the screen 3 in a picked-up image of the screen 3. At this time, the user position with respect to the screen 3 is mostly fixed and known.

The input device 2 may emit light from the light emission unit 22 and transmit real-time sensor information detected by the sensor unit 25 from the communication unit 23 to the information processing apparatus 1 only during when the operation unit 21 is operated and the input is on. Further, the input device 2 may perform predetermined threshold-value determination or predetermined gesture recognition on the basis of sensor information and perform control so that the input is turned on and light is emitted from the light emission unit 22 only in the case where conditions are satisfied. For example, the input device 2 may perform control so that light is emitted from the light emission unit 22 and sensor information is transmitted only in the case where the input device 2 is swung at a velocity whose value is equal to or higher than a predetermined value or predetermined movement is performed. Note that after transmitting sensor information or emitting light one time, the input device 2 may be in a sleep mode for a predetermined time period.

Further, the information processing apparatus 1 is capable of improving the accuracy of determination of the input device 2 by learning, for each user, how the user swings the input device 2.

In the case where users can be individually identified, it is also possible to present tactile stimulation signals or audio signals different for each user. For example, since adults and children have different strengths to perceive vibration in some cases, the tactile stimulation signal may be changed depending on the situation so that the adults and the children can perceive similar vibration. Further, it is also possible to change the used language and the like in the presented information, depending on the user attribution. Further, a weak tactile stimulation signal may be generated for elderly people, pregnant women, injured people, those with physical disabilities, and the like.

Since the information processing apparatus 1 knows, by the determination of the input device 2, who attacks which stereoscopic object 30, the visual feedback or visual effect on the screen 3 can be changed depending on who attacks.

The combination of the n types of wavelengths and the input devices 2 described in the first embodiment can be dynamically changed. For example, in the case where a first user operates the input device 2a, the information processing apparatus 1 causes the input device 2a to emit light with a first wavelength. In the case where a second user operates the input device 2b during the operation by the first user, the information processing apparatus 1 causes the input device 2b to emit light with a second wavelength. Next, in the case where the first user finishes the operation of the input device 2a and a third user operates an input device 2c during the operation of the input device 2b by the second user, the information processing apparatus 1 causes the input device 2c to emit light with the first wavelength. Next, in the case where the first user operates the input device 2a again during the operations by the second user and the third user, the information processing apparatus 1 causes the input device 2a to emit light with the first wavelength and the second wavelength (plurality of wavelengths). As described above, when performing control of light emission during the operations of the input devices 2 (or during when inputs are on), the information processing apparatus 1 is capable of increasing the number of people to be distinguished at the same time by performing control so that light is emitted with a wavelength that is not a wavelength with which other light is being emitted. For example, by using two types of wavelengths, it is possible to distinguish four or more people.

Further, in the case of failing to determine the input device 2 corresponding to the pointer, the information processing apparatus 1 may transmit the feedback of a better pointer (pointer that satisfies conditions) among a plurality of pointers to the input devices 2 that the information processing apparatus 1 fails to determine.

Further, the information processing apparatus 1 may calibrate various threshold values in advance for each input device 2. Accordingly, for example, it is possible to support the case where the light emission intensity is weakened, and reduce the individual difference of many input devices 2. Further, for each user attribution (adult, child, or age), various threshold values may be calibrated. For example, in the case of performing control of light emission when the input device 2 is swung at a certain velocity or more, since there is a difference in power between adults and children, the threshold value for performing control of light emission is adjusted depending on the user attribution.

Further, by combining the above-mentioned distinguishing methods, it is possible to increase the number of input devices 2 to be distinguished (i.e., the number of people to be individually identified).

6. Conclusion

As described above, in an information processing system according to an embodiment of the present disclosure, it is possible to achieve an intuitive tactile interface with more reality, which presents, on the basis of inputs from many input devices, predetermined tactile stimulation to corresponding input devices.

Although favorable embodiments of the present disclosure have been described in detail with reference to the accompanying drawings, the present disclosure is not limited to such embodiments. It is obvious that a person skilled in the art in the technical filed of the present disclosure can conceive various modified examples within the scope of the technical idea described in the scope of the appended claims, and it is understood that those examples of course belong to the technical scope of the present disclosure.

For example, it is possible to create a computer program that causes hardware such as the CPU (Central Processing Unit), ROM (Read Only Memory), and RAM (Random Access Memory) incorporated in the information processing apparatus 1 or input device 2 described above to exert the function of the information processing apparatus 1 or the input device 2. Further, a computer-readable storage medium that stores the computer program is also provided.

Further, the effects described herein are merely descriptive or exemplary, and not limitative. That is, the technology according to the present disclosure can exert other effects as evident to a person skilled from description of the present specification in the art may be provided in addition to or instead of the above-mentioned effects.

7. Regarding Transmission Delay

In each of the above-mentioned embodiment, when the communication unit 11 of the information processing apparatus 1 and the communication unit 23 of the input device 2 perform wireless communication, delay occurs. This delay can be dealt with as follows.

Figure 26:
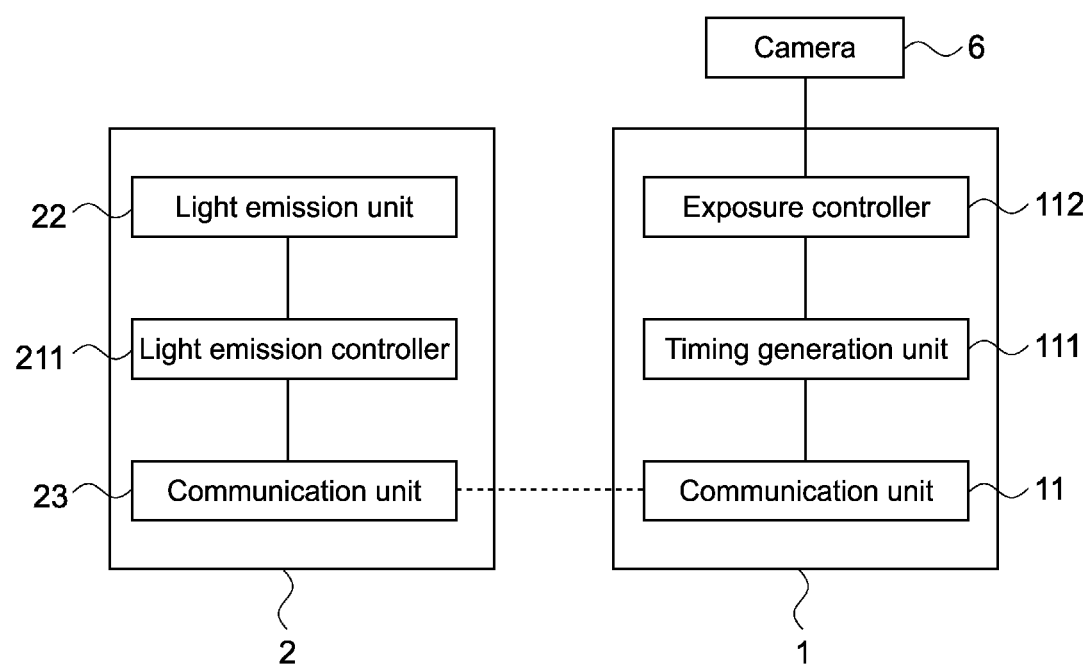
FIG. 26 is a block diagram showing a configuration of an information processing system according to an embodiment of the present disclosure.

FIG. 26 is a block diagram showing a configuration of an information processing system according to an embodiment of the present disclosure. As shown in FIG. 26, the information processing apparatus 1 includes the communication unit 11, a timing generation unit 111, and an exposure controller 112. Further, the input device 2 includes the communication unit 23, a light emission controller 211, and the light emission unit 22. Other configurations of the information processing apparatus 1 and the input devices 2 are similar to those in the above-mentioned embodiments.

The timing generation unit 111 generates a timing signal, and supplies the generated timing signal to the exposure controller 112 and the light emission controller 211.

The exposure controller 112 is connected to the camera 6, and controls exposure (shutter) of the camera in response to the timing signal supplied from the timing generation unit 111. The light emission controller 211 controls light emission of the light emission unit 22 in response to the timing signal supplied from the timing generation unit 111.

Figure 27:
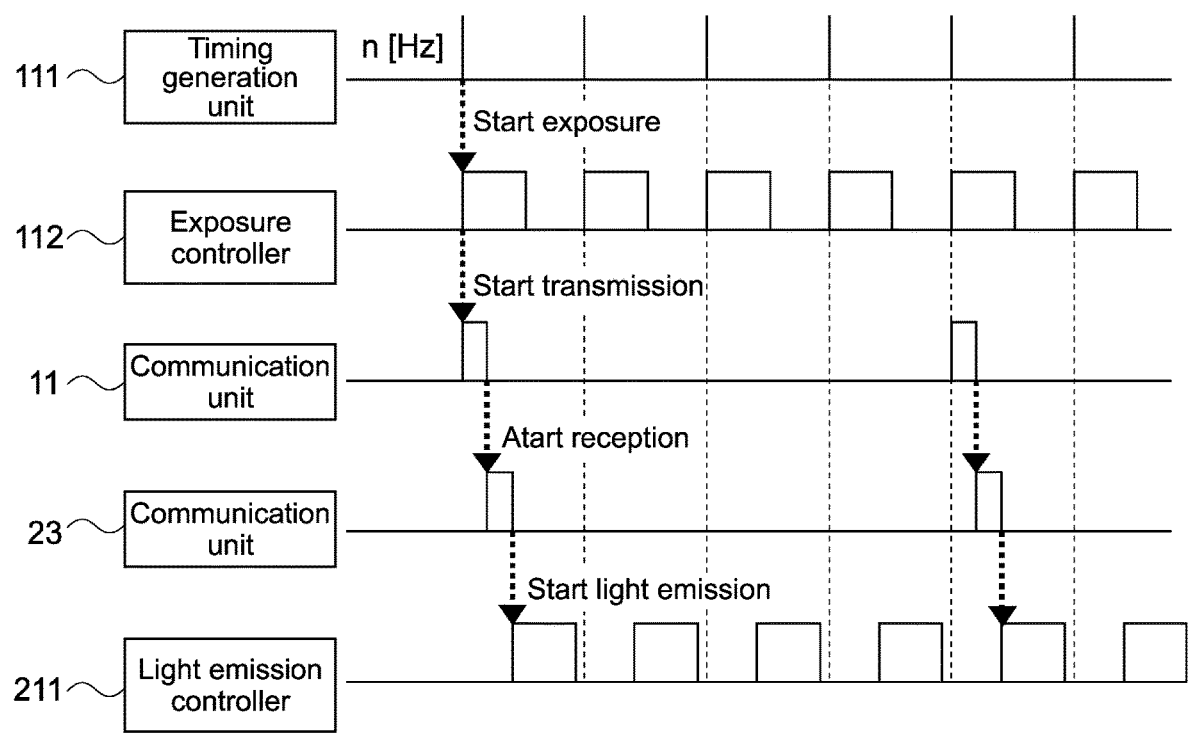
FIG. 27 is a schematic diagram showing an operation of the information processing system according to this embodiment.
Figure 28:
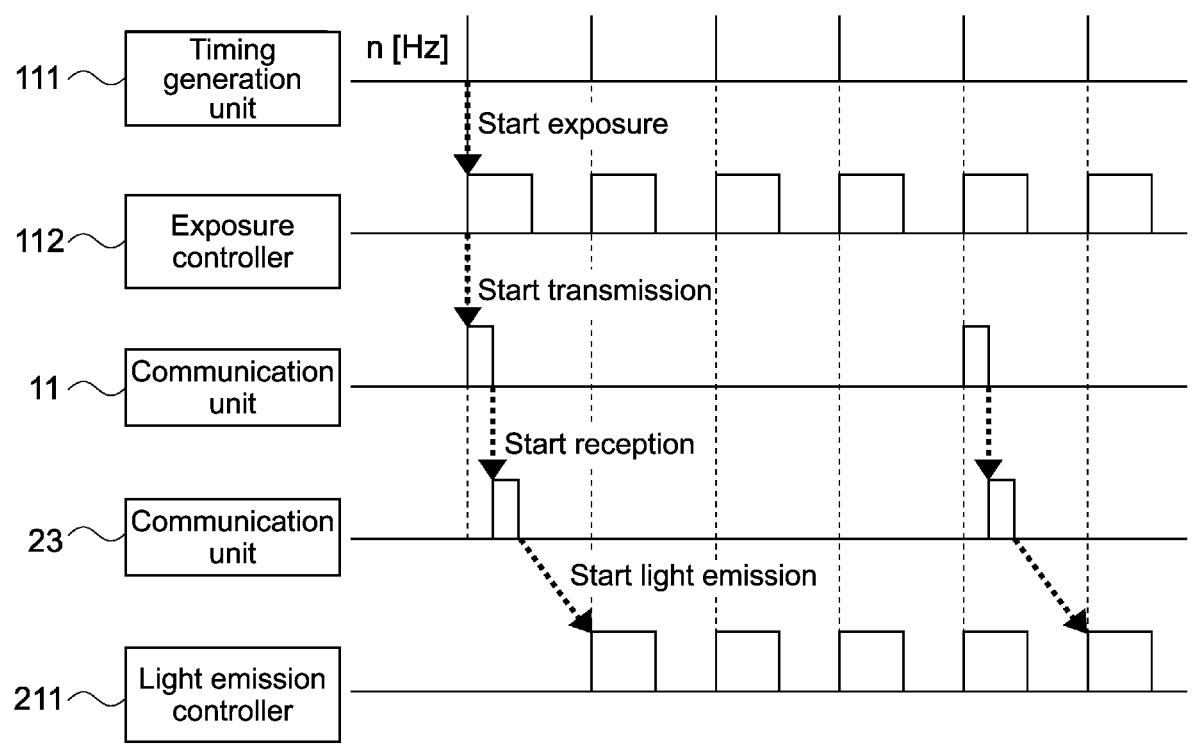
FIG. 28 is a schematic diagram showing an operation of the information processing system according to this embodiment.

FIG. 27 and FIG. 28 are each a schematic diagram showing an operation of the information processing system. As shown in FIG. 27, the timing generation unit 111 generates timing signals at predetermined intervals (nHz) and supplies the generated timing signals to the exposure controller 112 and the light emission controller 211.

The exposure controller 112 starts exposure of the camera 6 when being supplied with the timing signal. Further, the timing signal is wirelessly transmitted from the communication unit 11 to the communication unit 23, and supplied to the light emission controller 211. The light emission controller 211 starts light emission of the light emission unit 22 when being supplied with the timing signal.

Note that since certain delay occurs in wireless communication between the communication unit 11 and the communication unit 23, the timing when the light emission controller 211 starts light emission is delayed from the exposure start timing. Due to this, a shift occurs between the exposure timing of the camera 6 and the light emission timing of the light emission unit 22, and such a problem that a pointer generated by light emission of the light emission unit 22 is not imaged in an image picked up by the camera 6 or the amount of light of the pointer is reduced occurs.

In this regard, the timing generation unit 111 supplies the timing signal including delay information to the light emission controller 211. The delay information represents a delay time period generated by wireless communication between the communication unit 11 and the communication unit 23. The timing generation unit 111 causes the communication unit 11 to transmit data of the same size as that of the timing signal to the communication unit 23 in advance. The delay time period can be half the time period from when the communication unit 11 transmits the data to when the data is returned from the communication unit 23 to the communication unit 11.

As shown in FIG. 28, the light emission controller 211 shifts the light emission timing on the basis of the delay information, and controls the light emission unit 22 to emit light in accordance with the next exposure timing of the camera 6. Accordingly, the light emission timing of the light emission unit 22 corresponds to the exposure timing of the camera 6, which allows an image picked up by the camera 6 to reliably include the pointer. Note that in the case where the delay time period is long, the light emission controller 211 may cause the light emission unit 22 to emit light in accordance with the exposure timing after the next.

Further, the timing generation unit 111 may cause the timing signal to include device identification information for identifying the input device 2. Accordingly, even in the case where a plurality of input devices 2 receive the timing signals, the light emission controller 211 is capable of identifying the timing information to be trusted by the light emission controller 211 itself.

Further, the input device 2 may include a timer. The timing generation unit 111 transmits the timing signal including frequency information to the input device 2, which allows the input device itself to tick the timing.

Further, the timing generation unit 111 may cause the timing signal to include a timing signal for one input device among the plurality of input devices 2 and the number of input devices 2. The light emission controller 211 calculates a delay time period from the difference between the device identification information included in the timing signal and the device identification information of its own, and is capable of causing the light emission unit 22 to emit light at the timing of its own. For example, in the case where the timing signal for the input device 2 whose device number is 1 is transmitted, the light emission controller 211 of the input device 2 whose device number is 5 is capable of causing the light emission unit 22 to emit light after standing by until the order of the input device 2 itself comes.

Further, the timing generation unit 111 may sequentially transmit the same two timing signals with a short interval (e.g., 100 ms). In the case of succeeding in receiving the two timing signals at the interval, the light emission controller 211 is capable of regarding it as no transmission failure. In the case of failing to receive the two timing signals at the interval, the light emission controller 211 is capable of regarding the timing signal as an unreliable one.

Further, the timing generation unit 111 may transmit the same timing signal a plurality of times or prolong the interval of the timing signal, at the important timing. The important timing may be programmed in advance, or interval information may be included in a header.

Further, in the case where the state of the wireless communication is changed e.g., the communication environment is deteriorated, the interval of the timing signal may be prolonged, or the input device 2 may perform judgment by itself and start blinking. Further, in the case where the communication is interrupted, it is possible to switch to local processing and refrain from using wireless communication. In the case where wireless communication is not used, it is possible to collectively transmit data after a predetermined time period (e.g., 10 minutes) or prolong the interval of communication. The processing can be changed depending on the reliability of the transmission signal.

Further, in the case where the wireless delay is significant, the content may be switched. For example, in the case of failing to receive a wireless signal a plurality of times, the content may be replaced with other content or switched to the content in which delay is not worrisome.

The timing generation unit 111 controls the light emission timing of the plurality of input devices 2 in the above-mentioned configuration. However, the input devices 2 may communicate with each other to determine the light emission timing so as to ensure consistency. In the case of a synchronization mode in which the input devices 2 communicate with each other, after the light emission interval is prolonged and the synchronization is completed, the light emission interval may be shortened.

8. Identification of Input Device

Identification of the input device 2 in the case of controlling the exposure timing of the camera 6 and the light emission timing of the light emission unit 22 as described above will be described. FIG. 29 to FIG. 32 are each a schematic diagram showing a method of identifying the input device 2. Although the communication unit 11 and the communication unit 23 perform wired communication in the following example, wireless communication may be performed. Further, assumption is made that the plurality of input devices 2 include input devices 2a, 2b, and 2c.

Figure 30:
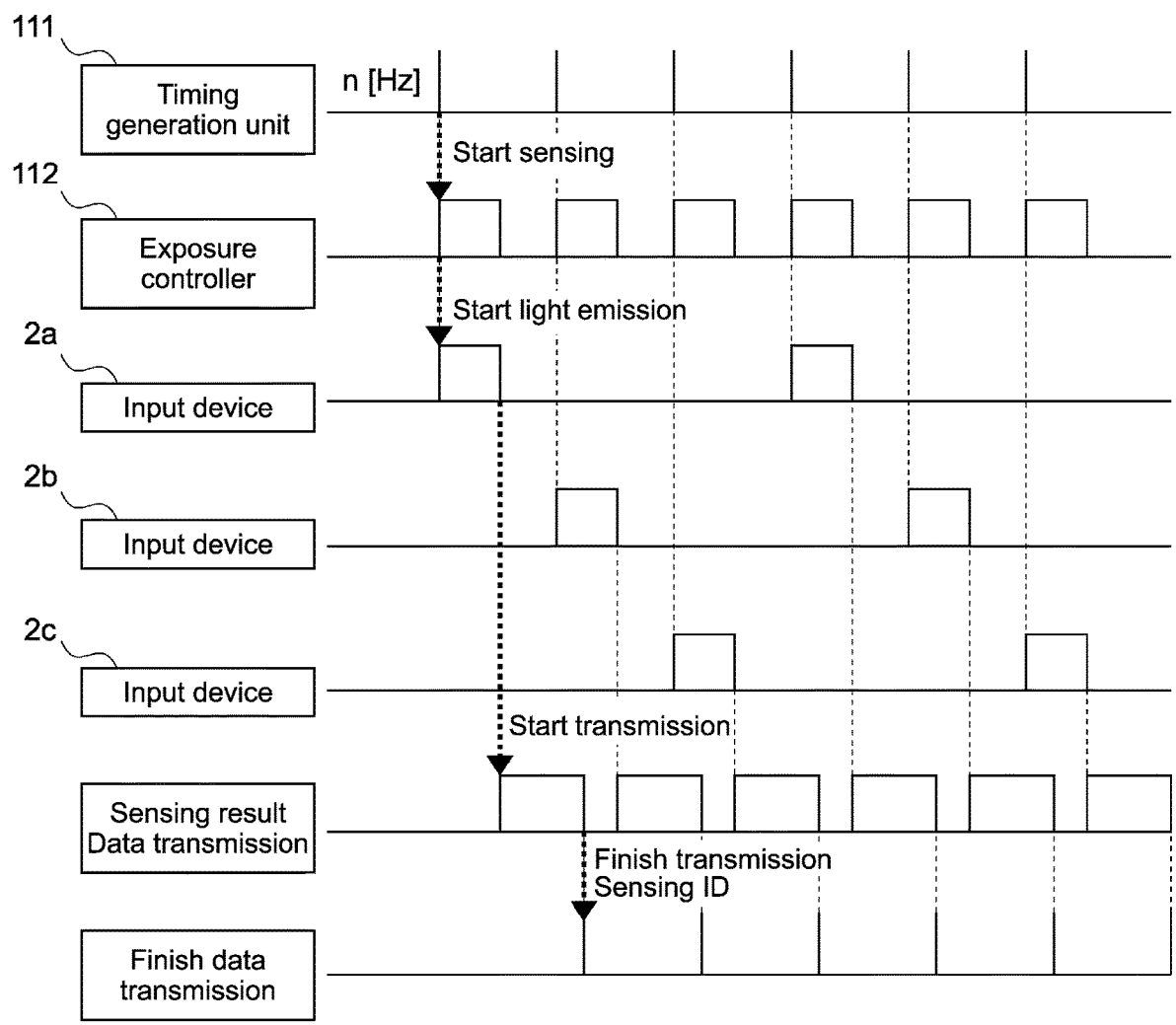
FIG. 30 is a schematic diagram showing an operation of the information processing system according to this embodiment.

As shown in FIG. 30, the timing generation unit 111 generates timing signals at a predetermined interval (nHz), and supplies the generated timing signals to the exposure controller 112 and the light emission controller 211.

When being supplied with the timing signal, the exposure controller 112 starts exposure of the camera 6. Further, when being supplied with the timing signal, the light emission controller 211 starts light emission. The camera 6 transmits data including an image generated by the exposure (hereinafter, referred to as the sensing result) to the control unit 10. The camera 6 may cause the sensing result to include an ID for identifying the image (hereinafter, referred to as the sensing ID).

In this case, the control unit 10 is capable of determining the sensing ID from the sensing result. However, the control unit 10 has a difficulty of determining which input device 2 generates, by light emission, the pointer included in the image represented by the sensing ID.

Figure 31:
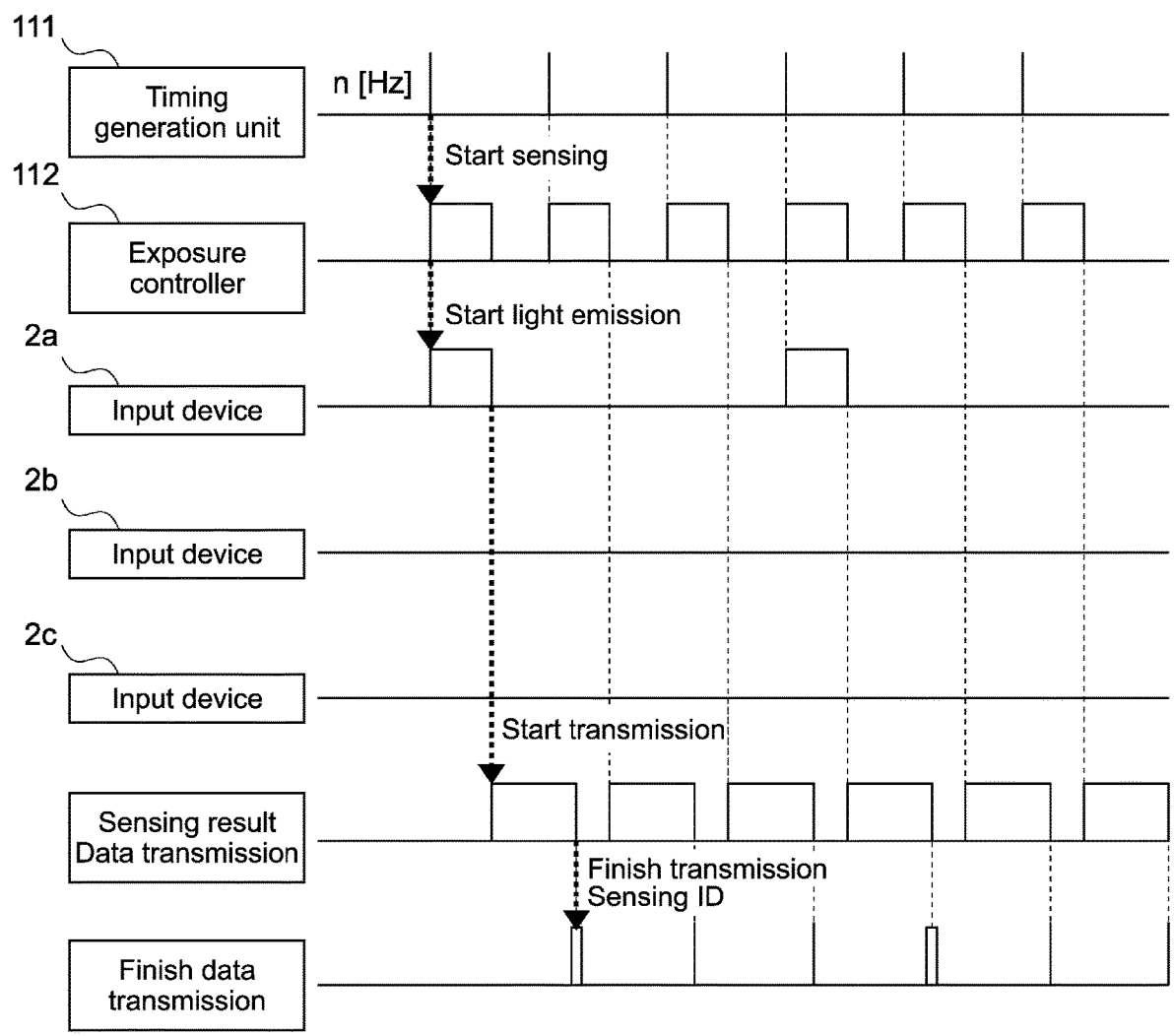
FIG. 31 is a schematic diagram showing an operation of the information processing system according to this embodiment.

In this regard, as shown in FIG. 31, only the light emission controller 211 of one input device 2 (input device 2a in FIG. 31) causes the light emission unit 22 to emit light, and the camera 6 transmits the sensing result to the control unit 10. Accordingly, the control unit 10 is capable of determining that a specific sensing result (e.g., every two frames) includes the pointer generated by light emission of the input device 2a. Also in the case of the other input devices (the input device 2b and 2c), similarly, by causing only the input device 2 to emit light, it is possible to associate the sensing result and the input device 2 with each other, and synchronize the sensing ID and an identifier (hereinafter, referred to as the control ID) of the input device 2 with each other.

Figure 29:
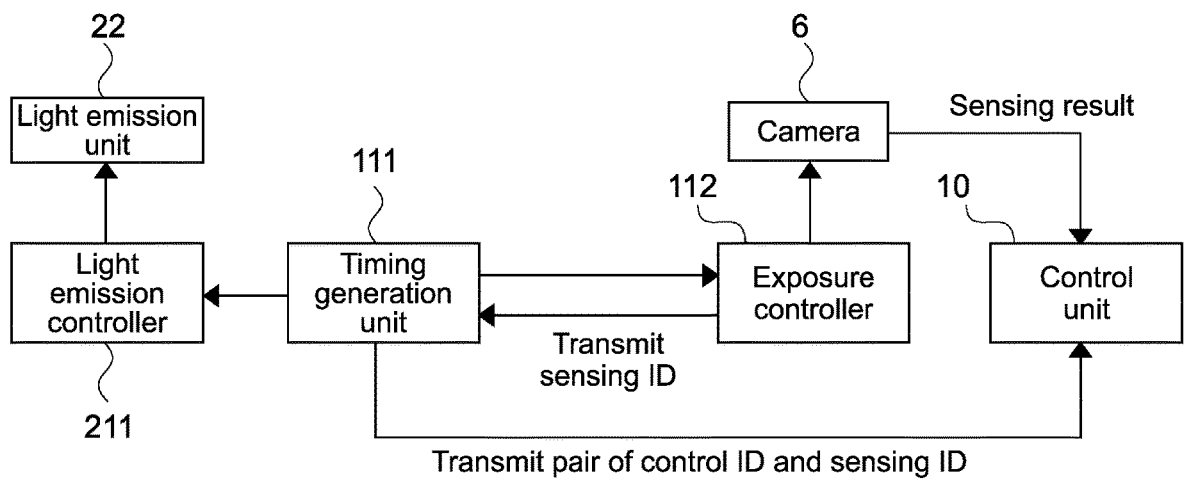
FIG. 29 is a block diagram showing an operation of an information processing system according to an embodiment of the present disclosure.
Figure 32:
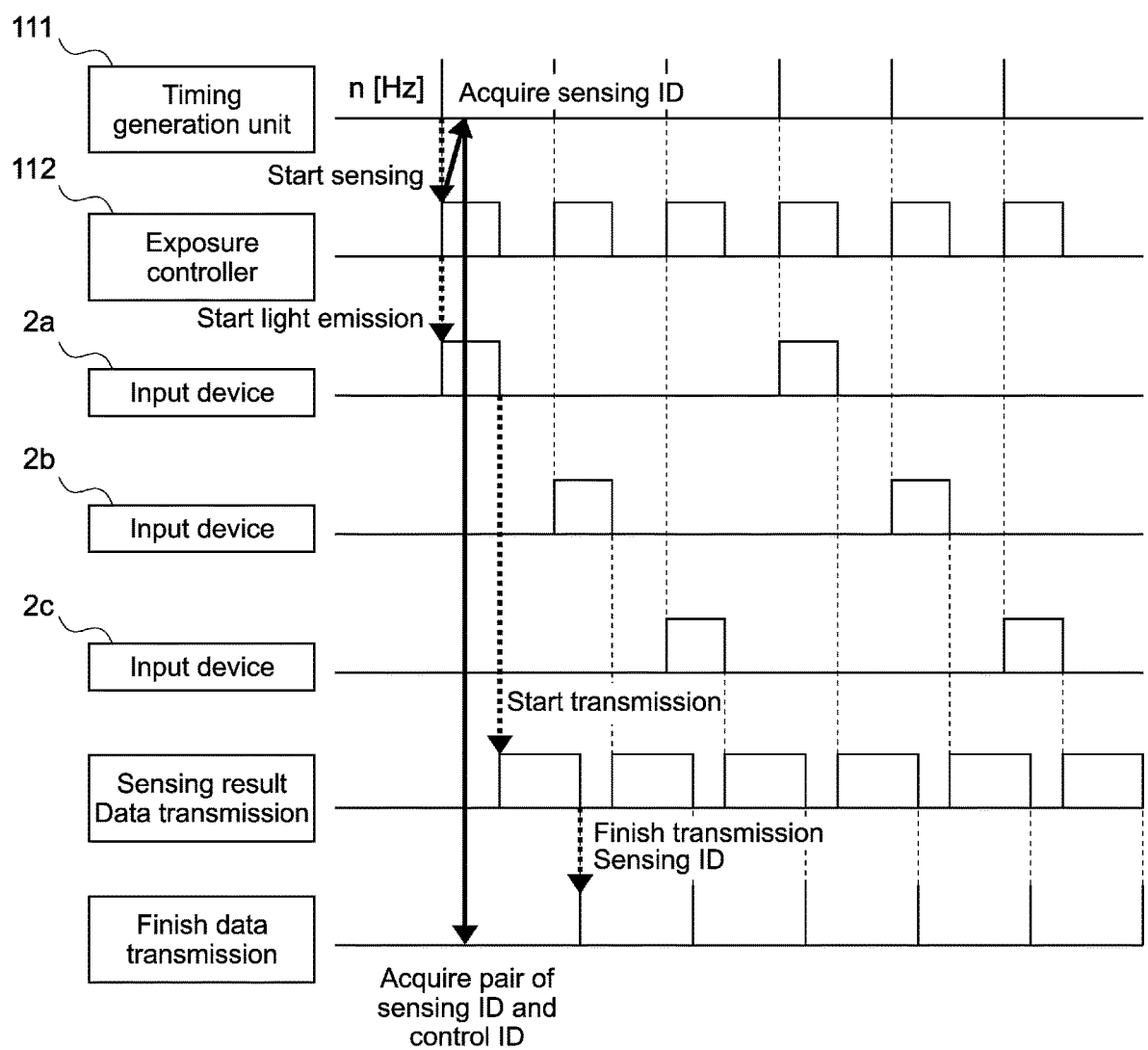
FIG. 32 is a schematic diagram showing an operation of the information processing system according to this embodiment.

Further, as another method, as shown in FIG. 29 and FIG. 32, when the timing generation unit 111 causes the camera 6 to perform exposure, the camera 6 transmits the sensing ID to the timing generation unit 111. At the same time, the timing generation unit 111 causes any of the input devices 2 to emit light, and associate the control ID of the input device and the sensing ID transmitted from the camera 6 with each other. The timing generation unit 111 transmits a pair of the control ID and the sensing ID to the control unit 10.

Accordingly, the control unit 10 is capable of synchronizing the control ID and the sensing ID with each other.

9. Modified Example

In an information processing system according to an embodiment of the present disclosure, the information processing apparatus 1 and the input device 2 may be placed at remote places. The operation of each configuration can be realized by using a cloud server or the like.

Although the camera 6 images the light emission (infrared rays) of the input device 2 in the above description, the present disclosure is not limited thereto. Various sensors may be used instead of the camera 6 as long as the input device 2 performs an operation that can be detected by the various sensors.

As described above, the light emission controller 211 shifts the light emission timing on the basis of the delay information, and controls the light emission unit 22 to emit light in accordance with the next exposure timing of the camera 6. However, by storing the log of the light emission timing of the light emission unit 22 and the exposure timing of the camera 6, it is possible to reduce the latency by means of machine learning or the like.

Note that, the present disclosure may also take the following configurations.

(1)

An information processing apparatus, including:

an acquisition unit configured to acquire a plurality of pointer information on the basis of one or more sensor data;

a determination unit configured to determine an input device corresponding to each pointer on the basis of features of the plurality of pointer information; and a generation unit configured to generate, in a case where a position of a pointer satisfies a predetermined condition, a predetermined tactile stimulation signal to be output to an input device corresponding to the pointer.

(2)

The information processing apparatus according to (1) above, in which the generation unit is configured to generate the predetermined tactile stimulation signal in a case where the position of the pointer or a trajectory of the pointer overlaps with a specific stereoscopic object.

(3)

The information processing apparatus according to (1) or (2) above, further including a transmission unit configured to transmit the generated tactile stimulation signal to a corresponding input device.

(4)

The information processing apparatus according to any one of (1) to (3) above, in which the generation unit is configured to further generate, in a case where the position of the pointer satisfies the predetermined condition, a predetermined tactile stimulation signal to be output to a tactile stimulation output device attached to a user holding the input device corresponding to the pointer.

(5)

The information processing apparatus according to any one of (1) to (4) above, in which the one or more sensor data is information regarding a picked-up image of a display screen, the pointer being applied to the display screen.

(6)

The information processing apparatus according to any one of (1) to (5) above, in which the features of the plurality of pointer information are a combination of a plurality of wavelengths.

(7)

The information processing apparatus according to (6) above, in which the features of the plurality of pointer information are a mark shape.

(8)

The information processing apparatus according to (6) above, in which the features of the plurality of pointer information are a state during swinging.

(9)

The information processing apparatus according to (6) above, in which the features of the plurality of pointer information are a state of a mark.

(10)

The information processing apparatus according to (6) above, in which combinations of the plurality of wavelengths and input devices corresponding to the plurality of wavelengths are dynamically structured.

(11)

The information processing apparatus according to any one of (6) to (10) above, in which the determination unit determines, on the basis of information regarding a plurality of picked-up image picked up by a plurality of imaging devices including band-pass filters corresponding to respective different wavelengths, an input device corresponding to a pointer on substantially the same coordinate pair in the plurality of picked-up images.

(12)

The information processing apparatus according to any one of (1) to (11) above, in which the acquisition unit acquires pointer information corresponding to input timing by the input device.

(13)

The information processing apparatus according to any one of (1) to (12) above, in which the determination unit determines the input device corresponding to each pointer on the basis of sensor information detected a sensor of the input device and the features of the plurality of pointer information.

(14)

The information processing apparatus according to any one of (1) to (13) above, in which the input device performs an input in a case where sensor information detected by a sensor of the input device satisfies a predetermined condition.

(15)

The information processing apparatus according to any one of (12) to (14) above, in which the input performed by the input device is light emission from a light emission unit provided to the input device.

(16)

The information processing apparatus according to any one of (13) to (15) above, in which the determination unit determines the input device corresponding to the pointer on the basis of at least any of motion sensor information and posture sensor information and a trajectory of the pointer or an angle of the trajectory, the motion sensor information and the posture sensor information being output from the input device, the trajectory of the pointer and the angle of the trajectory being represented by the features of the plurality of pointer information.

(17) The information processing apparatus according to (3) above, in which
the transmission unit transmits, in a case where the determination unit fails to determine input devices corresponding to a plurality of pointers, a predetermined tactile stimulation signal to be output to an input device corresponding to a pointer that satisfies the predetermined condition among the plurality of pointers to all the input devices that the determination unit fails to determine.

(18) An information processing method, including;
by a processor,
acquiring a plurality of pointer information on the basis of one or more sensor data;
determining an input device corresponding to each pointer on the basis of features of the plurality of pointer information; and
generating, in a case where a position of a pointer satisfies a predetermined condition, a predetermined tactile stimulation signal to be output to an input device corresponding to the pointer.

(19) A program that causes a computer to functions as:
an acquisition unit configured to acquire a plurality of pointer information on the basis of one or more sensor data;
a determination unit configured to determine an input device corresponding to each pointer on the basis of features of the plurality of pointer information; and
a generation unit configured to generate, in a case where a position of a pointer satisfies a predetermined condition, a predetermined tactile stimulation signal to be output to an input device corresponding to the pointer.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
an acquisition unit configured to acquire a plurality of pointer information associated with a plurality of pointers, on the basis of one or more sensor data;
a determination unit configured to determine an input device corresponding to each pointer of the plurality of pointers, on the basis of features of the plurality of pointer information associated with wavelength emissions of the input devices corresponding to the plurality of pointers; and
a generation unit configured to generate, in a case where a position of a pointer satisfies a predetermined condition, a predetermined tactile stimulation signal to be output to an input device corresponding to the pointer.

2. The information processing apparatus according to claim 1, wherein
the generation unit is configured to generate the predetermined tactile stimulation signal in a case where the position of the pointer or a trajectory of the pointer overlaps with a specific stereoscopic object.

3. The information processing apparatus according to claim 1, further comprising
a transmission unit configured to transmit the generated tactile stimulation signal to a corresponding input device.

4. The information processing apparatus according to claim 1, wherein
the generation unit is configured to further generate, in a case where the position of the pointer satisfies the predetermined condition, a predetermined tactile stimulation signal to be output to a tactile stimulation output device attached to a user holding the input device corresponding to the pointer.

5. The information processing apparatus according to claim 1, wherein
the one or more sensor data is information regarding a picked-up image of a display screen, the pointer being applied to the display screen.

6. The information processing apparatus according to claim 1, wherein
the features of the plurality of pointer information are a combination of a plurality of wavelengths.

7. The information processing apparatus according to claim 6, wherein
the features of the plurality of pointer information are a mark shape.

8. The information processing apparatus according to claim 6, wherein
the features of the plurality of pointer information are a state during swinging.

9. The information processing apparatus according to claim 6, wherein
the features of the plurality of pointer information are a state of a mark.

10. The information processing apparatus according to claim 6, wherein
combinations of the plurality of wavelengths and input devices corresponding to the plurality of wavelengths are dynamically structured.

11. The information processing apparatus according to claim 6, wherein
the determination unit determines, on the basis of information regarding a plurality of picked-up image picked up by a plurality of imaging devices including band-pass filters corresponding to respective different wavelengths, an input device corresponding to a pointer on substantially the same coordinate pair in the plurality of picked-up images.

12. The information processing apparatus according to claim 1, wherein
the acquisition unit acquires pointer information corresponding to input timing by the input device.

13. The information processing apparatus according to claim 1, wherein
the determination unit determines the input device corresponding to each pointer on the basis of sensor information detected a sensor of the input device and the features of the plurality of pointer information.

14. The information processing apparatus according to claim 1, wherein
the input device performs an input in a case where sensor information detected by a sensor of the input device satisfies a predetermined condition.

15. The information processing apparatus according to claim 12, wherein
the input performed by the input device is light emission from a light emission unit provided to the input device.

16. The information processing apparatus according to claim 13, wherein
the determination unit determines the input device corresponding to the pointer on the basis of at least any of motion sensor information and posture sensor information and a trajectory of the pointer or an angle of the trajectory, the motion sensor information and the posture sensor information being output from the input device, the trajectory of the pointer and the angle of the trajectory being represented by the features of the plurality of pointer information.

17. The information processing apparatus according to claim 3, wherein
the transmission unit transmits, in a case where the determination unit fails to determine input devices corresponding to a plurality of pointers, a predetermined tactile stimulation signal to be output to an input device corresponding to a pointer that satisfies the predetermined condition among the plurality of pointers to all the input devices that the determination unit fails to determine.

18. An information processing method, comprising;
by a processor,
acquiring a plurality of pointer information associated with a plurality of pointers, on the basis of one or more sensor data;
determining an input device corresponding to each pointer of the plurality of pointers, on the basis of features of the plurality of pointer information associated with wavelength emissions of the input devices corresponding to the plurality of pointers; and
generating, in a case where a position of a pointer satisfies a predetermined condition, a predetermined tactile stimulation signal to be output to an input device corresponding to the pointer.

19. A non-transitory computer-readable medium having embodied thereon a program, which when executed by a computer causes the computer to execute a method, the method comprising:
acquiring a plurality of pointer information associated with a plurality of pointers, on the basis of one or more sensor data;
determine an input device corresponding to each pointer of the plurality of pointers, on the basis of features of the plurality of pointer information associated with wavelength emissions of the input devices corresponding to the plurality of pointers; and
generate in a case where a position of a pointer satisfies a predetermined condition, a predetermined tactile stimulation signal to be output to an input device corresponding to the pointer.

* * * * *